(12) United States Patent
Yagai et al.

(10) Patent No.: US 7,723,878 B2
(45) Date of Patent: May 25, 2010

(54) MOTOR FOR ELECTRIC POWER STEERING AND METHOD FOR MANUFACTURING THE SAME

(75) Inventors: Masamichi Yagai, Hitachinaka (JP); Mitsuaki Mirumachi, Hitachinaka (JP); Toshiaki Ueda, Naka (JP); Shin Onose, Naka (JP)

(73) Assignee: Hitachi, Ltd., Tokyo (JP)

( * ) Notice: Subject to any disclaimer, the term of this patent is extended or adjusted under 35 U.S.C. 154(b) by 909 days.

(21) Appl. No.: 11/319,158

(22) Filed: Dec. 28, 2005

(65) Prior Publication Data

US 2006/0138883 A1     Jun. 29, 2006

(30) Foreign Application Priority Data

Dec. 28, 2004    (JP)    ............................. 2004-380632

(51) Int. Cl.
*H02K 11/00*    (2006.01)
(52) U.S. Cl. ...................................................... 310/71
(58) Field of Classification Search .................. 310/71, 310/260, 270
See application file for complete search history.

(56) References Cited

U.S. PATENT DOCUMENTS

| | | | |
|---|---|---|---|
| 3,984,712 A * | 10/1976 | Hill | ............................. 310/71 |
| 5,008,572 A | 4/1991 | Marshall et al. | |
| 5,532,533 A | 7/1996 | Mizutani | |
| 5,770,902 A * | 6/1998 | Batten et al. | ................... 310/71 |
| 6,011,339 A * | 1/2000 | Kawakami | ................... 310/208 |
| 6,600,244 B2 * | 7/2003 | Okazaki et al. | ............... 310/71 |
| 7,247,962 B2 | 7/2007 | Burgbacher | |
| 2002/0175574 A1 | 11/2002 | Okazaki et al. | |
| 2004/0070293 A1* | 4/2004 | Kabasawa et al. | ............. 310/71 |
| 2004/0119345 A1 | 6/2004 | Takano | |

FOREIGN PATENT DOCUMENTS

| | | |
|---|---|---|
| DE | 203 00 478 U1 | 3/2003 |
| DE | 103 15 871 A1 | 10/2004 |
| JP | 2002-153003 A | 5/2002 |
| JP | 2003-134724 | 5/2003 |

OTHER PUBLICATIONS

European Search Report dated Sep. 1, 2008 (Ten (10) pages).

\* cited by examiner

*Primary Examiner*—Dang D Le
(74) *Attorney, Agent, or Firm*—Crowell & Moring LLP

(57) ABSTRACT

A small-sized motor for electric power steering, in which coil connection can be easily performed with space saving, and a method for manufacturing the motor. Multi-phase stator coils assembled in a stator coil are connected per phase by connecting rings at coil ends of the stator coils. A bus bar supplied with electric power from the exterior is stacked onto the connecting rings in the axial direction of the motor and is electrically connected to the connecting rings.

6 Claims, 16 Drawing Sheets

FIG.3

| | NUMBER OF SLOTS S | | | | |
|---|---|---|---|---|---|
| NUMBER OF POLES P | 3 | 6 | 9 | 12 | 15 |
| 2 | | | | | |
| 4 | | | | | |
| 6 | | | | | |
| 8 | | | | | |
| 10 | | | | | |

MOTOR FOR ELECTRIC POWER STEERING AND METHOD FOR MANUFACTURING THE SAME

BACKGROUND OF THE INVENTION

1. Field of the Invention

The present invention relates to a motor for electric power steering and a method for manufacturing the motor. More particularly, the present invention relates to a motor for electric power steering, which is suitable for a motor having multi-phase stator coils and includes connecting members per phase and among phases, and to a method for manufacturing the motor.

2. Description of the Related Art

In a known motor, winding conductors are interconnected per phase to constitute multi-phase stator coils, and the stator coils are electrically connected to power harnesses per phase. Then, the power harnesses are withdrawn out of the motor.

As disclosed in, e.g., JP-A-2003-134724, there is also known a motor in which winding conductors are interconnected by flat-plate conductors per phase to constitute multi-phase stator coils, and the flat-plate conductors are withdrawn out of the motor.

SUMMARY OF THE INVENTION

In the first-mentioned known motor, however, the size of a connecting portion is increased and a larger space is required to accommodate the connecting portion. Accordingly, in the case of a motor having a limitation in mount space, e.g., a small-sized motor for use in electric power steering, employment of the known connecting structure inevitably increases the motor size to such an extent that the motor cannot be installed in the limited mount space.

Also, when the flat-plate conductors are employed as disclosed in JP-A-2003-134724, an operation for joining the coils and the flat-plate conductors to each other is interfered with in areas where the flat-plate conductors are withdrawn out of the motor, thus resulting in deterioration of assembly efficiency.

An object of the present invention is to provide a small-sized motor for electric power steering, in which coil connection can be easily performed with space saving, and a method for manufacturing the motor.

The motor for electric power steering according to the present invention has a small size and enables the coil connection to be easily performed with space saving.

One typical feature of the present invention resides in that a wiring (connecting) member comprises a first wiring member for connecting stator coils per phase, and a second wiring member supplied with electric power from the exterior, and the first wiring member and the second wiring member are stacked in an axial direction of the motor and electrically connected to each other.

Another typical feature of the present invention resides in that the motor for electric power steering is manufactured through a first step of assembling stator coils in a stator core; a second step of connecting the stator coils per phase by a first wiring member at coil ends of the stator coils which are axially projected from an axial end of the stator core including the stator coils assembled therein; and a third step of axially stacking a second wiring member, which is supplied with electric power from the exterior, onto the first wiring member and electrically connected the second wiring member to the first wiring member.

According to the present invention, the size of a wiring connecting portion of the motor can be reduced and the connecting operation can be facilitated.

A typical mode of the motor for electric power steering according to the present invention is as follows.

In a motor for electric power steering, which is driven by multi-phase AC power and outputs steering torque, the motor comprises a frame, a stator fixed to the frame, and a rotor disposed opposite to the stator with a gap left therebetween. The stator comprises a stator core, and multi-phase stator coils assembled in the stator core. The stator core is formed by joining a plurality of split core pieces together, and comprises an annular back core portion and a plurality of teeth core portions radially projecting from the annular core portion. A slot is formed between adjacent two of the plurality of teeth core portions of the stator core, and the stator coils are accommodated in the slots. The stator coils are interconnected per phase by a first wiring member and are taken out to the exterior by a second wiring member. The first wiring member and the exterior second wiring member are stacked in the axial direction of the motor. The rotor comprises a rotor core and a plurality of magnets fixed to an outer peripheral surface of the rotor core. The stator core and the stator coils are molded with a molding material in a state where the stator coils are assembled in the stator core.

A typical mode of the method of manufacturing the motor for electric power steering according to the present invention is as follows.

In a method of manufacturing a motor for electric power steering, which is driven by multi-phase AC power and outputs steering torque, the method comprises a first step of assembling stator coils in a stator core; a second step of electrically connecting coil ends of the stator coils, which are axially projected from an axial end of the stator core including the stator coils assembled therein, to a first wiring member assembled in the coil end side of the stator core in an axial direction of the motor; and a third step of electrically connecting a second wiring member, which is assembled in the coil end side of the stator core in the axial direction of the motor, to the first wiring member, thereby forming a wiring connecting portion in an axially stacked multi-layered structure.

BRIEF DESCRIPTION OF THE DRAWINGS

FIG. 3 is a table for explaining the relationship between the number of poles P and the number of slots S in an AC motor;

DESCRIPTION OF THE PREFERRED EMBODIMENTS

The structure and operation of a motor for electric power steering system according to one embodiment of the present invention will be described below with reference to FIGS. 1-16.

First, the structure of the motor for electric power steering according to the embodiment will be described with reference to FIGS. 1 and 2.

Figure 1:
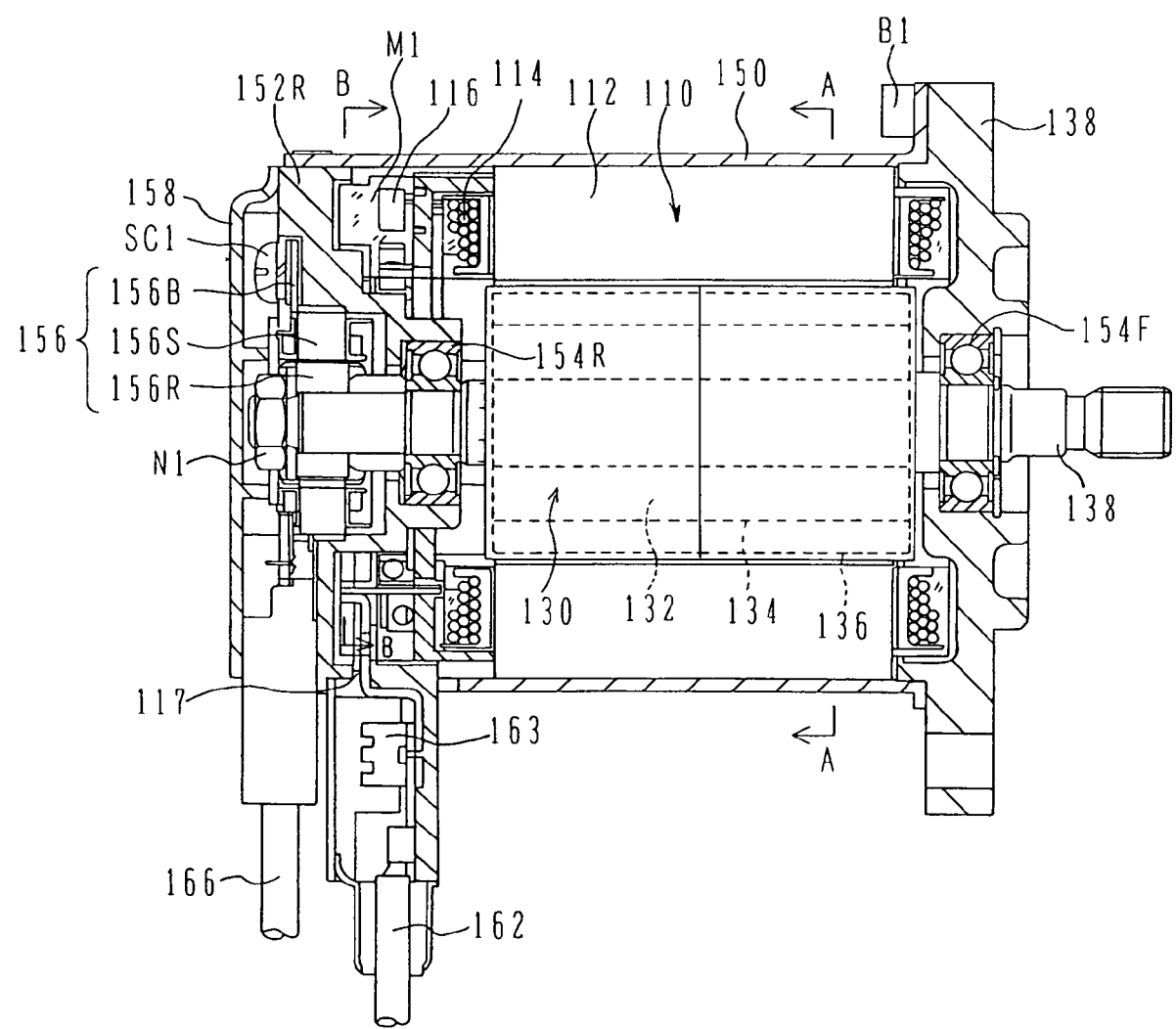
FIG. 1 is a longitudinal sectional view showing the structure of a motor for electric power steering according to an embodiment of the present invention.

FIG. 1 is a longitudinal sectional view showing the structure of a motor for electric power steering according to the embodiment. FIGS. 2A and 2B are each a sectional view taken along the line A-A in FIG. 1; specifically, FIG. 2A is an entire sectional view and FIG. 2B is an enlarged sectional view of a principal portion.

A motor 100 for electric power steering (referred to as an "EPS motor 100" hereinafter) is a synchronous motor of the surface magnet type comprising a stator 110 and a rotor 130 rotatably supported inside the stator 110. The EPS motor 100 is driven by electric power supplied from an onboard power supply including a battery, e.g., a 14V power supply system (output voltage of the battery being 12 V), a 24V power supply system, a 42V power supply system (output voltage of the battery being 36 V), or a 48V power supply system.

The stator 110 comprises a stator core 112 formed of a magnetic member which is fabricated by laminating silicon steel sheets, and a stator coil 114 held in each of slots formed in the stator core 112. The stator core 112 is made up of, as described later with reference to FIG. 2, an annular back core and a plurality of teeth which are fabricated separately from the back core and thereafter mechanically fixed to the back core. The stator coil 114 is wound over each of the plurality of teeth. The stator coil 114 is formed in a distributed winding or concentrated winding way.

The stator coil 114 with the distributed winding is superior in field-weakening control and generation of reluctance torque. In the EPS motor, it is very important to reduce the motor size and the winding resistance. The stator coil 114 with the concentrated winding is advantageous in shortening the coil end length of the stator coil 114, to thereby shorten the length of the EPS motor 100 in the direction of axis of its rotation. Also, the shortening of the coil end length of the stator coil 114 reduces the resistance of the stator coil 114 and suppresses a rise of the motor temperature. Further, the smaller coil resistance results in a smaller copper loss of the motor. It is hence possible to reduce a proportion of a part of energy inputted to the motor, which is consumed by the copper loss, and to increase the efficiency of output torque with respect to the input energy.

As mentioned above, the EPS motor is driven by the onboard power supply. The output voltage of the onboard power supply is fairly low in many cases. More specifically, switching devices constituting an inverter, the motor, and other connection means in a current supply circuit are connected between terminals of the onboard power supply so as to equivalently constitute a serial circuit, and a total of terminal voltages of those circuit component devices in the serial circuit provides the voltage between the terminals of the onboard power supply. For that reason, the terminal voltage of the motor obtained for supply of current to the motor is fairly low. In order to ensure sufficient current flowing into the motor under such a situation, it is very important to suppress the copper loss in the motor as low as possible. Thus, the onboard power supply is a low voltage system of not higher than 50 V in many cases, and therefore the stator coil 114 is preferably formed in a concentrated winding way. Particularly, that feature is very important when the 12V power supply system is used.

The EPS motor 100 is disposed near a steering column or a rack and pinion. In any layout, the EPS motor is required to have a smaller size. Furthermore, because the stator windings have to be fixed in a smaller-sized structure, easier winding operation is also important. The concentrated winding is easier in the winding operation and the winding fixing operation than the distributed winding.

The coil end of the stator coil 114 is molded with a resin. Because it is desired in the EPS motor that torque fluctuations, such as cogging torque, be minimized, the interior of the stator is often subjected to cutting again after assembly of the stator. Such a machining process generates chip. From the necessity of preventing the chip from entering the coil end of the stator coil, the coil end is preferably molded. The term "coil end" means one of plural portions of the stator coil 114, which is axially projected from corresponding one of axial opposite ends of the stator core 112. In the embodiment, gaps are left between the molded resin covering the coil ends of the stator coil 114 and a frame 150, but the resin may be filled so as to contact with the frame 150, a front flange 152F, and a rear flange 152R. Such full filling of the resin is advantageous in transmitting heat generated by the stator coil 114 directly from the coil ends to the frame 150, the front flange 152F, and the rear flange 152R through the molded resin for dissipation to the exterior, and hence suppressing a temperature rise of the stator coil 114 in comparison with the case of transmitting the generated heat via air.

The stator coil 114 is constituted as coils for three phases, i.e., U-, V- and W-phase, and each coil is made up of a plurality of unit coils. The plurality of unit coils for each of the three phases are interconnected, as described later with reference to FIG. 3, by a connecting ring 116 disposed on the left end as viewed in FIG. 2. The connecting ring 116 is electrically connected to a bus bar 117, and the bus bar 117 is connected to a power cable 162 externally of the motor.

The EPS motor is often required to output large torque. For example, when a steering wheel is quickly rotated in the state where a vehicle is stopped or in the state where it is running at a very low speed, the EPS motor is required to output large torque in order to overcome the frictional resistance caused between the steered wheels and the ground surface. On that occasion, a large current is supplied to the stator coil. The current reaches 100 A or more though depending on conditions. In some cases, the current may reach 70 A or 150 A. The use of the connecting ring 116 and the bus bar 117 is very important from the viewpoints of supplying such a large current with safety and reducing heat generated by the large current. By supplying the current to the stator coil through the connecting ring 116 and the bus bar 117, the connection resistance can be reduced and a voltage drop due to the copper loss can be suppressed. This facilitates the supply of the large current. As still another advantage, the time constant in rising of the current upon operation of the devices in the inverter can be reduced.

The stator core 112 and the individual stator coils 114 are integrally molded with a resin (electrically insulating) to constitute an integral stator SubAssy. The integral stator SubAssy is obtained by press-fitting the stator core 112 and the stator coils 114 in a cylindrical frame 150 made of a metal, e.g., aluminum, and molding those members with the resin in the state where they are fixed inside the frame 150. As an alternative, the integral stator SubAssy may be obtained by molding the stator core 112 and the stator coils 114 with the resin in the state where the stator coils 114 are assembled in the stator core 112, and then press-fitting the assembly into the frame 150.

The EPS motor mounted on an automobile is subjected to not only various vibrations, but also impacts from the wheels. Also, the EPS motor is used under a condition of large changes of the atmospheric temperature. In some cases, the EPS motor is exposed to a condition of −40° C. or in excess of 100° C. due to a local temperature rise. Further, the motor has to be protected against intrusion of water. In order to fix the stator in the yoke (frame) 150 to be endurable even under those conditions, the stator SubAssy is desirably press-fitted into a cylindrical metallic frame having no holes other than screw holes at least in its portion located around a stator core. After the press fitting, the stator may be further fixed from the outer peripheral side of the frame by using screws. Any suitable means for checking rotation is preferably provided in addition to the press fitting.

The rotor 130 comprises a rotor core 132 formed of a magnetic member which is fabricated by laminating silicon steel sheets, a plurality of magnets 134 in the form of permanent magnets fixed to the surface of the rotor core 132 by an adhesive, and a magnet cover 136 made of a nonmagnetic substance and disposed around the magnets 134. The magnets 134 are each a magnet made of a rare earth element, e.g., neodymium. The rotor core 132 is fixed to a shaft 138. With the arrangement that the plurality of magnets 134 are fixed to the surface of the rotor core 132 by the adhesive and the magnet cover 136 is disposed around the magnets 134 so as to cover them from the outer side, the magnets 134 are prevented from scattering away. The magnet cover 136 is made of stainless steel (so-called SUS). A tape may be wound over the magnets instead, but using the magnet cover 136 made of stainless steel is easier to manufacture the motor. The EPS motor having the above-described structure is superior in reliably holding the permanent magnets in place, which are subjected to very large vibrations and thermal changes and are rather apt to break. Moreover, the magnets can be prevented from scattering away even if they are broken.

The front flange 152F is disposed at one end of the cylindrical frame 150. The frame 150 and the front flange 152F are fixed to each other by bolts B1. The rear flange 152R is press-fitted to the other end of the frame 150. The front flange 152F and the rear flange 152R are provided with bearings 154F, 154R, respectively. The shaft 138 and the stator 110 fixed to the shaft 138 are rotatably supported by the bearings 154F, 154R.

The front flange 152F is provided with an annular projected (extended) portion. The projected portion of the front flange 152F is axially projected toward the coil end from its lateral surface facing the coil end. The projected portion of the front flange 152F has a distal end formed such that, when the front flange 152F is fixed to the frame 150, the distal end is inserted in a gap defined between the molded resin over the coil end on the same side as the front flange 152F and the frame 150. Also, to increase heat release from the coil end, the projected portion of the front flange 152F is preferably held in close contact with the molded resin over the coil end on the same side as the front flange 152F.

The rear flange 152R has a cylindrical recess. The cylindrical recess of the rear flange 152R is concentric with the axis of the shaft 138 and is located at an axially more inner position (nearer to the stator core 112) than the corresponding axial end of the frame 150. A distal end of the cylindrical recess of the rear flange 152R is extended to a position radially inside the coil end on the same side as the rear flange 152R such that the distal end is opposed to the coil end on the same side as the rear flange 152R in the radial direction. A bearing 154 is disposed at the distal end of the cylindrical recess of the rear flange 152R. An axial end of the shaft 138 on the same side as the rear flange 152R is extended axially outward (in the direction opposite to the rotor core 132) beyond the bearing 154 to such an extent that the axial end is positioned near an opening of the cylindrical recess of the rear flange 152R or it is somewhat projected axially outward of the opening.

A resolver 156 is disposed in a space formed between an inner peripheral surface of the cylindrical recess of the rear flange 152R and an outer peripheral surface of the shaft 138. The resolver 156 comprises a resolver stator 156S and a resolver rotor 156R. The resolver 156 is positioned axially outward of the bearing 154R (in the direction opposite to the rotor core 132). The resolver rotor 156R is fixed to one end of the shaft 138 (left end as viewed in the drawing) by a nut N1. The resolver stator 156S is fixedly held inside the cylindrical recess of the rear flange 152R in opposed relation to the resolver rotor 156R, while a gap is left between them, through a resolver retainer plate 156B fixed to the rear flange 152R by a screw SC1. The resolver stator 156S and the resolver rotor 156R cooperatively constitute the resolver 156. Respective positions of the plurality of magnets 134 can be detected by detecting the rotation of the resolver rotor 156R with the resolver stator 156S. More specifically, the resolver 156 comprises the resolver rotor 156R having an uneven outer circumferential surface (in the form of, e.g., an ellipse or a flour leaf), and the resolver stator 156S including two output coils (electrically shifted 90° from each other) and an excitation coil, which are wound over a core. When an AC voltage is applied to the excitation coil, AC voltages are generated in the two output coils depending on changes in length of the gap between the resolver rotor 156R and the resolver stator 156S with a phase difference proportional to the rotational angle. In such a way, the resolver detects two output voltages with a phase difference between them. The magnetic pole position of the rotor 130 can be detected by determining a phase angle based on the phase difference between the two detected output voltages. A rear holder 158 is mounted to an outer periphery of the rear flange 152R so as to cover the resolver 156.

From the external battery, electric power is supplied to the stator coils of the U-, V- and W-phases, which are interconnected by the connecting ring 116 per phase, through the bus bar 117, the power cable 162, and a terminal 163 attached to a fore end of the power cable 162. The bus bar 117 is welded to the connecting ring 116 per phase and is withdrawn externally of the motor. The terminal 163 attached to the fore end of the power cable (harness) 162 is welded to the bus bar 117. A pole position signal detected by the resolver stator 156S is taken out to the exterior via a signal cable 166. The rear holder 158 is mounted to the rear flange 152R such that the motor 100 is enclosed for protection of the resolver 156. The connecting ring 116 and a part of the bus bar 117 are molded with a molding material (resin) M1 in an axially stacked structure together with the corresponding coil end.

The structures of the stator 110 and the rotor 130 will be described in more detail below with reference to FIGS. 2A and 2B.

FIG. 2A is an entire sectional view taken along the line A-A in FIG. 1, and FIG. 2B is an enlarged sectional view of a portion P in FIG. 2A. Note that the same reference numerals as those in FIG. 1 denote the same components.

The structure of the stator 110 will be first described. The stator core 112 shown in FIG. 1 is made up of an annular back core 112B and a plurality of teeth 112T separate from the back core 112B. The back core 112B is fabricated by punching sheets made of a magnetic substance, e.g., silicon steel sheets, by pressing, and then laminating the punched sheets in multiple layers.

In the embodiment, the teeth 112T is made up of twelve independent teeth 112T(U1+), 112T(U1−), 112T(U2+), 112T(U2−), 112T(V1+), 112T(V1−), 112T(V2+), 112T(V2−), 112T(W1+), 112T(W1−), 112T(W2+) and 112T(W2−). Stator coils 114(U1+), 114(U1−), 114(U2+), 114(U2−), 114(V1+), 114(V1−), 114(V2+), 114(V2−), 114(W1+), 114(W1−), 114(W2+) and 114(W2−) are wound respectively over the teeth 112T(U1+), . . . , 112T(W2−) in the concentrated winding way.

Here, the stator coil 114(U1+) and the stator coil 114(U1−) are wound such that the directions of currents flowing through those coils are opposite to each other. Also, the stator coil 114(U2+) and the stator coil 114(U2−) are wound such that the directions of currents flowing through those coils are opposite to each other. Further, the stator coil 114(U1+) and the stator coil 114(U2+) are wound such that the directions of currents flowing through those coils are the same. The stator coil 114(U1−) and the stator coil 114(U2−) are wound such that the directions of currents flowing through those coils are the same. The relationships of the directions in which currents flow through the stator coils 114(V1+), 114(V1−), 114(V2+) and 114(V2−), and the relationships of the directions in which currents flow through the stator coils 114(W1+), 114(W1−), 114(W2+) and 114(W2−) are the same as those for the stator coils of the U-phase.

Since twelve teeth 112T and twelve stator coils 114 are manufactured in the same manner, assembly steps of the tooth 112T(U1+) and the stator coil 114(U1+) will be described below by way of example. The stator coil 114(U1+) is a formed coil that is previously formed into a shape resulting when it is wound over the tooth 112T(U1+). The stator coil 114(U1+) prepared as the formed coil is formed together with a bobbin 112BO. An integral member of the stator coil 114(U1+) and the bobbin 112BO formed together is fitted over the tooth 112T(U1+) from the back end side thereof. Because a fore end of the tooth 112T(U1+), i.e., an end of the tooth 112T(U1+) on the side facing the rotor 130, is expanded in the circumferential direction, the expanded portion serves as a stopper to hold the bobbin 112BO and the stator coil 114(U1+) in place. A projection 112TT capable of engaging in a recess 112BK formed in an inner periphery of the back core 112B is formed at the back end of the tooth 112T(U1+). The tooth 112T(U1+) is fixed to the back core 112B by press-fitting the projection 112TT of the tooth 112T(U1+), over which the formed stator coil 114(U1+) is wound, into the recess 112BK of the back core 112B. Steps of mounting the other stator coils 114(U1−), . . . , 114(W2−) to the corresponding teeth 112T(U1−), . . . , 112T(W2−), and steps of fixing the teeth 112T(U1−), . . . , 112T(W2−) to the back core 112B are the same as those described above.

In a state where the twelve teeth 112T mounted with the stator coils 114 are fixed to the back core 112B and the back core 112B is press-fitted at plural points on the outer periphery thereof into the inner periphery of the frame 150, the stator core 112 and the stator coils 114 are integrally molded with a thermosetting resin MR to constitute the stator SubAssy. The embodiment has been described in connection with the case of integrally molding the stator core 112 and the stator coils 114 with the resin in the state where the assembly obtained by assembling the stator coils 114 in the stator core 112 is press-fitted into the frame 150. As an alternative, the stator core 112 and the stator coils 114 may be integrally molded with the resin in the state where the stator coils 114 are assembled in the stator core 112, followed by press-fitting the stator core 112 into the frame 150.

The molding process using a molding material is carried out as follows. A jig (not shown) is mounted to a structure comprising the stator core 112 and the frame 150 such that the stator core 112 and the coil ends of the stator coils 114 axially projecting from the axial ends of the stator core 112 are surrounded by the jig (not shown) and the frame 150. The molding material in a fluid state is poured into a space surrounded by the jig (not shown) and the frame 150, causing the molding material to fill into areas around the coil ends, a gap between the stator coil and the connecting ring 116, a gap between the connecting ring 116 and the bus bar 117, gaps in the stator core 112, gaps in the stator coils 114, gaps between the stator core 112 and the stator coils 114, and a gap between the stator core 112 and the frame 150. The molding material is then hardened. After the molding material has been hardened, the jig (not shown) is removed.

An inner peripheral surface of the molded stator SubAssy, i.e., fore end surfaces of the teeth 112T(U1−), . . . , 112T(W2−) positioned to radially face the rotor 130, are subjected to cutting. The cutting reduces variations of the gap between the stator 110 and the rotor 130 and improves the roundness of the stator 110 at the inner diameter. Also, the above-described integral molding is effective in increasing release of heat generated upon supply of currents to the stator coils 114 in comparison with the case of not performing the integral molding. In addition, the integral molding is effective in preventing vibrations of the stator coils and the teeth.

For example, assuming the gap between the outer periphery of the rotor core of the rotor 130 and the inner peripheries of the teeth of the stator 110 to be 3 mm (3000 μm), the stator roundness at the inner diameter is about ±30 μm due to a manufacturing error of the back core 112B, manufacturing errors of the teeth 112T, assembly errors caused in press-fitting assembly of the back core 112B and the teeth 112T, etc. Because such a value of the roundness corresponds to 1% (=30 μm/3000 μm) of the gap, there occurs cogging torque attributable to the stator roundness at the inner diameter. By cutting the inner periphery of the stator after the molding process, however, the cogging torque attributable to the stator roundness at the inner diameter can be reduced. The reduced cogging torque improves a steering feel in the steering operation.

Projections 150T are formed on the inner peripheral surface of the frame 150. Recesses 112BO2 are formed in the outer peripheral surface of the back core 112B corresponding to the projections 150T, as shown in detail in FIG. 2B. Each projection 150T and each recess 112BO2 define an interface portion IP where the projection 150T and the recess 112BO2 having different curvatures engage with each other. Eight projections 150T and eight recesses 112BO2 are formed continuously in the axial direction at angular intervals in the circumferential direction. The interface portion IP serves also as a press-fitting portion. In other words, when the stator core 112 is fixed to the frame 150, the recesses 112BO2 of the back core 112B are press-fitted to the projections 150T of the frame 150 such that projected end surfaces of the projections 150T and bottom surfaces of the recesses 112BO2 are held in contact pressure with each other in the interface portions. Thus, in the embodiment, the stator core 112 is fixed to the frame 150 by partial press fitting. With the partial press fitting, a small gap is formed between the frame 150 and the stator core 112. In the embodiment, therefore, when the stator core 112 and the stator coils 114 are molded with a molding material (resin) MR, the molding material MR is filled into the small gap between the frame 150 and the stator core 112 at the same time. Additionally, the interface portions IP serve as rotation stoppers for preventing the stator core 112 from rotating relative to the frame 150 in the circumferential direction.

As described above, in the embodiment, since the stator core 112 is partially press-fitted to the frame 150, it is possible to increase slippage between the frame 150 and the stator core 112, and to reduce the rigidity. As a result, the embodiment can increase the effect of attenuating noises caused between the frame 150 and the stator core 112. Further, in the embodiment, since the molding material is filled in the gap between the frame 150 and the stator core 112, the effect of attenuating noises is further increased.

Alternatively, the projections 150T and the recesses 112BO2 may be held not contact with each other to serve only as the rotation stoppers, while the outer peripheral surface of the back core 112B may be press-fitted to the inner peripheral surface of the frame 150 in portions other than the projections 150T and the recesses 112BO2.

Further, the stator coils 114(U1+), 114(U1−) and the stator coils 114(U2+), 114(U2−) are arranged in symmetrical positions about the center of the stator 110. Also, the stator coils 114(U1+), 114(U1−) are arranged adjacent to each other, and the stator coils 114(U2+), 114(U2−) are arranged adjacent to each other. Moreover, the stator coils 114(U1+), 114(U1−) and the stator coils 114(U2+), 114(U2−) are arranged in line symmetrical relation about the center of the stator 110. In other words, with respect to a broken line C-C passing the center of the shaft 138, the stator coil 114(U1+) and the stator coil 114(U2+) are arranged in line symmetrical relation, and the stator coil 114(U1−) and the stator coil 114(U2−) are arranged in line symmetrical relation.

Similarly, the stator coils 114(V1+), 114(V1−) are arranged in line symmetrical relation to the stator coils 114(V2+), 114(V2−), and the stator coils 114(W1+), 114(W1−) are arranged in line symmetrical relation to the stator coils 114(W2+), 114(W2−).

The two adjacent stator coils 114 of the same phase are formed by continuously winding a single wire. For example, the stator coils 114(U1+), 114(U1−) are formed by continuously winding a single wire to constitute two coils and fitting the two coils over one tooth in winding relation to the tooth. The stator coils 114(U2+), 114(U2−) are also formed by continuously winding a single wire. Similarly, respective pairs of the stator coils 114(V1+), 114(V1−), the stator coils 114(V2+), 114(V2−), the stator coils 114(W1+), 114(W1−), and the stator coils 114(W2+), 114(W2−) are each formed by continuously winding a single wire.

By thus arranging the corresponding stator coils in line symmetrical relation and forming the two adjacent stator coils of the same phase by winding a single wire, the arrangement of individual connecting rings can be simplified, as described later with reference to FIG. 6, when the stator coils of the same phase or the different phases are interconnected by the individual connecting rings.

The structure of the rotor 130 will be described below. The rotor 130 comprises a rotor core 132 made of a magnetic substance, ten magnets 134 (134A, 134B, 134C, 134D, 134E, 134F, 134G, 134H, 134I and 134J) fixed to the surface of the rotor core 132 by an adhesive, and a magnet cover 136 disposed around the magnets 134. The rotor core 132 is fixed to the shaft 138.

One half of the magnets 134 are each radially magnetized such that, when the surface side (side positioned to face the stator teeth 112T) is magnetized to an N pole, the rear side (side bonded to the rotor core 132) is magnetized to an S pole. The other half of the magnets 134 are each radially magnetized such that, when the surface side (side positioned to face the stator teeth 112T) is magnetized to an S pole, the rear side (side bonded to the rotor core 132) is magnetized to an N pole. Then, the adjacent magnets 134 are magnetized such that the magnetized poles are alternately arranged in the circumferential direction. For example, when the surface side of the magnet 134A is magnetized to an N pole, the surface sides of the adjacent magnets 134B, 134J are each magnetized to an S pole. In such a way, when the surface sides of the magnets 134A, 134C, 134E, 134G and 134I are magnetized to N poles, the surface sides of the magnets 134B, 134D, 134F, 134H and 134J are magnetized to S poles.

Each of the magnets 134 has a semi-cylindrical shape in cross-section. The term "semi-cylindrical shape" means a structure that, looking at the magnet in the circumferential direction, left and right portions have a smaller radial thickness than a central portion. By forming the magnet into such a semi-cylindrical shape, magnetic flux can be produced in sinusoidal distribution. Therefore, a voltage can be induced in sinusoidal waveform with the rotation of the EPS motor, and pulsations can be reduced. The reduction of pulsations improves a steering feel in the steering operation. Additionally, when the magnets are formed by magnetizing a ring-shaped magnetic substance, a sinusoidal or similar distribution of magnetic flux may be obtained with control of magnetization forces.

The rotor core 132 has ten through holes 132H having a relatively large diameter and formed in concentric relation, and five dents 132K having a relatively small diameter and formed in the side radially inward of the through holes 132H. The rotor core 132 is fabricated by punching sheets made of a magnetic substance, e.g., SUS, by pressing, and then laminating the punched sheets in multiple layers. The dents 132K are formed by embossing the sheet in the pressing step. When a plurality of sheets are laminated in multiple layers, the corresponding dents 132K are engaged with each other for proper positioning. The through holes 132H serve to reduce the inertia, and the presence of the through holes 132H contributes to improving balance of the rotor. The outer peripheral side of the magnets 134 is covered with the magnet cover 136 so that the magnets 134 are prevented from scattering away. Additionally, the back core 112B and the rotor core 132 are formed at the same time by punching of the same sheet.

As described above, the rotor 130 in the embodiment has ten magnets 134 and hence has 10 poles. Also, there are twelve teeth 112T, and the number of slots defined between the adjacent teeth is 12. Thus, the EPS motor 100 according to the embodiment is a synchronous motor of the surface magnet type having 10 poles and 12 slots.

The relationship between the number of poles P and the number of slots S in an AC motor will be described with reference to FIG. 3.

Figure 3:
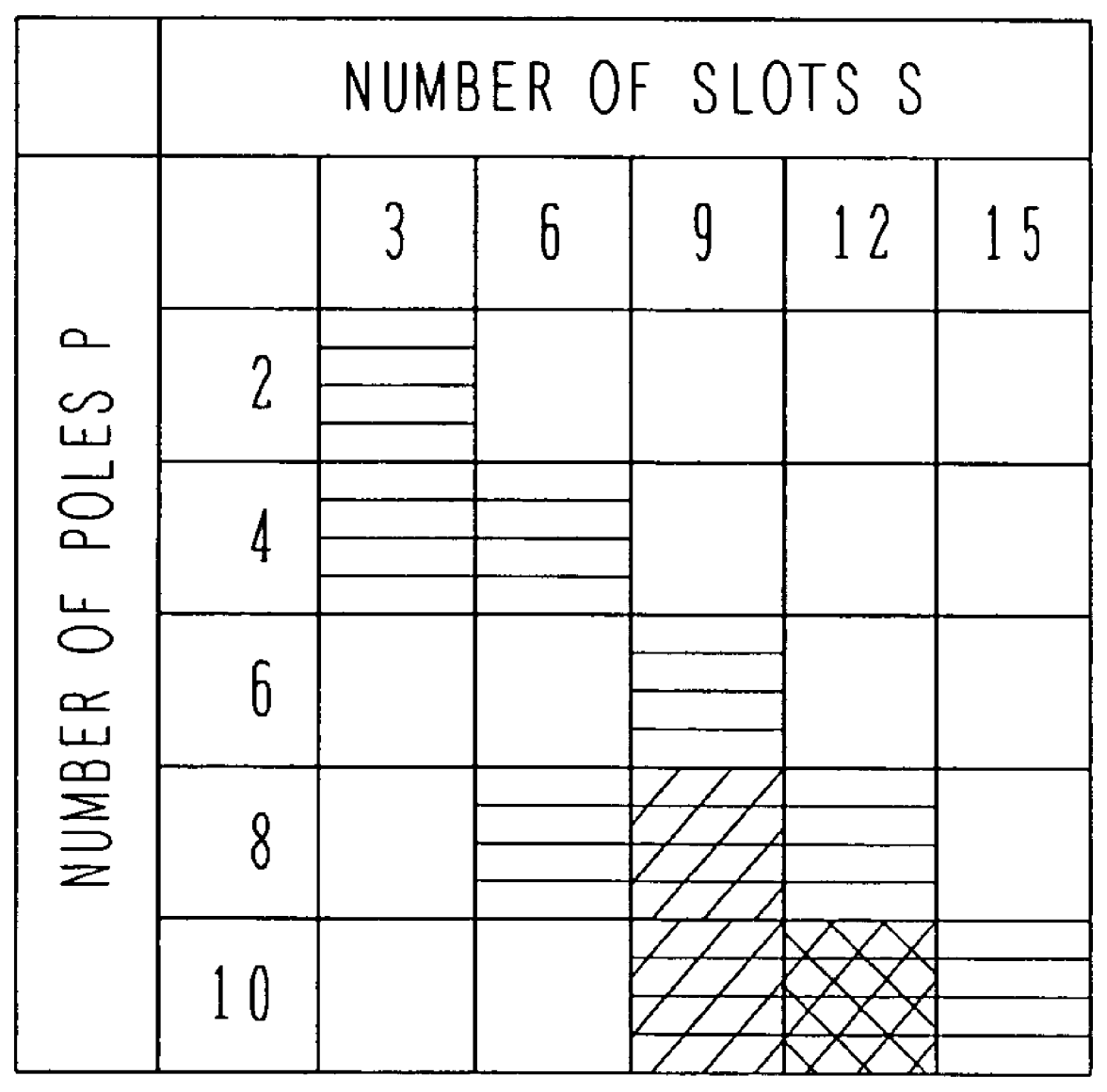

FIG. 3 is a table for explaining the relationship between the number of poles P and the number of slots S in an AC motor.

In FIG. 3, horizontally hatched boxes represent combinations of the number of poles P and the number of slots S, which are usable in a 3-phase AC motor (brushless motor). More specifically, the 3-phase AC motor can be constituted as one of combinations of 2 poles-3 slots, 4 poles-3 slots, 4 poles-6 slots, 6 poles-9 slots, 8 poles-6 slots, 8 poles-9 slots, 8 poles-12 slots, 10 poles-9 slots, 10 poles-12 slots, and 10 poles-15 slots. Among them, the combination of 10 poles and 12 slots represented by both ascent and descent oblique hatch lines corresponds to the number of poles and the number of slots in the motor according to the embodiment. The combinations of 8 poles-9 slots and 10 poles-9 slots represented by ascent oblique hatch lines will be described later. Note that combinations with the number of poles P being 12 or more are not shown in FIG. 3 because the EPS motor 100 shown in FIG. 1 is a small-sized motor having an outer diameter of 85 φ and the number of poles P being 12 or more cannot be realized in such a small-sized motor.

Since motors in the combinations of 2 poles-3 slots, 4 poles-3 slots, 4 poles-6 slots, 6 poles-9 slots, 8 poles-6 slots, 8 poles-12 slots, and 10 poles-15 slots have similar characteristics, the following description is made by taking the motor of 6 poles and 9 slots as a typical example.

As compared with the AC motor of 6 poles and 9 slots, a higher utilization factor of magnetic flux can be obtained with the motor of 10 poles and 12 slots according to the embodiment. More specifically, because the AC motor of 6 poles and 9 slots has a winding coefficient (winding utilization factor) kw of 0.87 and a skew coefficient ks of 0.96, the utilization factor (kw·ks) of the magnet-producing magnetic flux is "0.83". On the other hand, because the motor of 10 poles and 12 slots according to the embodiment has a winding coefficient kw of 0.93 and a skew coefficient ks of 0.99, the utilization factor (kw·ks) of the magnet-producing magnetic flux is "0.92". Thus, the motor of 10 poles and 12 slots according to the embodiment can increase the utilization factor (kw·ks) of the magnet-producing magnetic flux.

Also, since the cycle of cogging torque is given by the least common multiple of the number of poles P and the number of slots S, the cycle of cogging torque is "18" in the AC motor of 6 poles and 9 slots is "18", while it is "60" in the motor of 10 poles and 12 slots according to the embodiment. As a result, the cogging torque can be reduced in the motor of the embodiment.

Further, the cogging torque caused by errors in the stator roundness at the inner diameter can be reduced. More specifically, when the cogging torque caused by errors in the stator roundness at the inner diameter is assumed to be "3.7" in the AC motor of 6 poles and 9 slots, it is "2.4" in the motor of 10 poles and 12 slots according to the embodiment. As a result, the motor of the embodiment can reduce the cogging torque caused by errors in the stator roundness at the inner diameter. Moreover, in the embodiment, since the stator roundness at the inner diameter is improved by cutting the inner peripheral surface of the molded stator SubAssy, it is possible to further reduce the cogging torque caused by errors in the stator roundness at the inner diameter.

The measured values of cogging torque of the motor for electric power steering according to the embodiment will be described below with reference to FIGS. 4A and 4B.

Figure 4A:
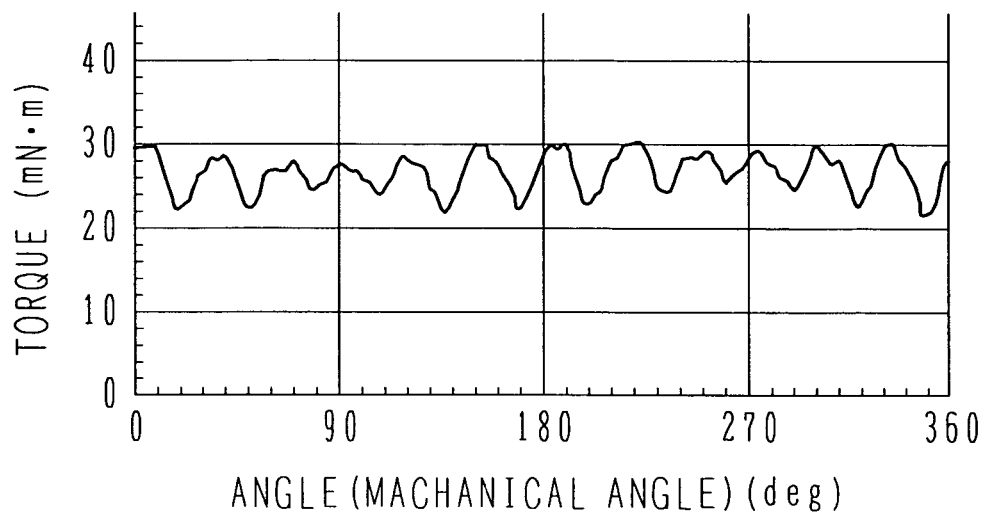
FIGS. 4A and 4B are each a graph showing measured values of cogging torque of the motor for electric power steering according to the embodiment of the present invention.
Figure 4B:
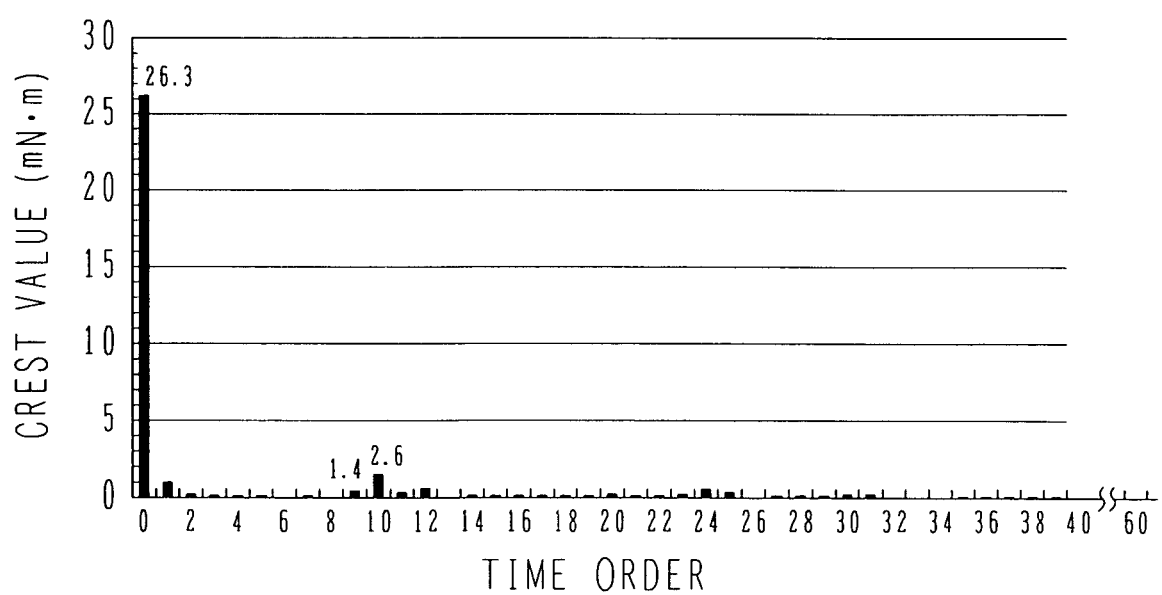

FIGS. 4A and 4B are each a graph showing the measured values of cogging torque of the motor for electric power steering according to the embodiment.

FIG. 4A shows the cogging torque (mNm) actually measured in the 360°-range of angle (mechanical angle) from 0 to 360°, and FIG. 4B shows the crest value (mNm) resulting when higher harmonic components of the cogging torque shown in FIG. 4A are separated into respective time orders. The time order "60" represents the above-mentioned cycle of cogging torque in the motor of 10 poles and 12 slots, and the cogging torque generated at the time order "60" is substantially 0. The time order "12" represents the cogging torque due to variations in field forces of the magnets of 10 poles. By using a semi-cylindrical magnet as each of the magnets in the embodiment as described above, the cogging torque due to variations in field forces can also be reduced to 1.4. The time order "10" represents the cogging torque due to variations in the teeth of the stator having 12 slots. As a result of improving the stator roundness at the inner diameter by cutting after the molding step, the cogging torque due to variations in the teeth can also be reduced to 2.6.

The time order "0" represents a DC component, i.e., the so-called loss torque (frictional torque generated when the rotation speed is substantially zero). As seen, the loss torque is reduced to 26.3 mNm. Therefore, returnability of the steering wheel is increased even when the driver releases the steering wheel from the hands, because the loss torque is smaller than the restoring force causing the steering wheel to return toward the straight-forwarding direction.

As a result of the above-mentioned reductions in the respective cogging torque components, as shown in FIG. 4A, the cogging torque can be reduced to 9 mNm. Since the maximum torque of the EPS motor is 4.5 Nm, the cogging torque is reduced to 0.2% (=9 mNm/4.5 Nm) (namely, not larger than ³⁄₁₀₀₀ of the rated value). In addition, the loss torque is also reduced to 0.57% (=26.3 mNm/4.5 Nm).

The EPS motor 100 of the embodiment is a motor using an onboard battery (with an output voltage of, e.g., 12 V) as a power supply. The EPS motor 100 is mounted in a position near a steering column or a rack of a rack-and-pinion gear for transmitting torque of the steering column to wheels. From such a restriction in mount position, the EPS motor is required to have a smaller size. On the other hand, the EPS motor is also required to be able to produce large torque (e.g., 4.5 Nm) for power assistance of the steering operation.

When the required torque is outputted from an AC servomotor using AC 100 V as a power source, a motor current is about 5 A. However, when the AC servomotor is driven using AC 14 V obtained through DC-AC conversion of DC 14V as in this embodiment, a motor current of 70 A-100 A is required to output substantially the same torque with substantially the same volume. In order to flow such a large current, the diameter of the stator coil 114 must be as large as 1.6φ. In this case, the number of turns of the stator coil 114 is 14 turns (T).

Usually, the number of turns of the stator coil 114 is in the range of, e.g., 9-21 T though depending on the wire diameter of the stator coil. If the wire diameter of the stator coil 114 is set to 1.8φ, the number of turns is 9 T. As compared with the 1.8-φ coil, an area occupancy rate can be increased, e.g., 75% by employing the 1.6φ coil. An increase of the area occupancy rate relatively reduces current density in a conductor. As a result, it is possible to reduce the copper loss, to suppress a temperature rise of the motor, and to improve a rotation speed—torque characteristic. Some of recent electric vehicles are equipped with a 42V battery. In such a vehicle, since the motor current can be reduced, the number of turns of the stator coil 114 is 20-30 T.

In the adjacent teeth 112T, a spacing W1 between the expanded portions of the fore ends (on the side facing the rotor 130) of those teeth 112T (e.g., a spacing W1 between the expanded portions of the fore ends of the tooth 112T(U1−) and the tooth 112T(W1−) (namely, a circumferential spacing between respective portions of those teeth which are closest to each other in the circumferential direction)) is set to 1 mm. By thus narrowing the spacing between the teeth, the cogging torque can be reduced. Further, even with vibrations applied to the motor, the stator coil 114 can be prevented from slipping off toward the rotor side through the spacing between the adjacent teeth because the wire diameter of the stator coil 114 is larger than the spacing W1. The spacing W1 between the adjacent teeth is preferably set to, e.g., the range of 0.5 mm-1.5 mm smaller than the wire diameter of the stator coil 114. Thus, in the embodiment, the spacing W1 between the adjacent teeth is set smaller than the wire diameter of the stator coil 114.

The connection relationship of the stator coils in the motor for electric power steering according to the embodiment will be described below with reference to FIGS. 5 and 6.

Figure 5:
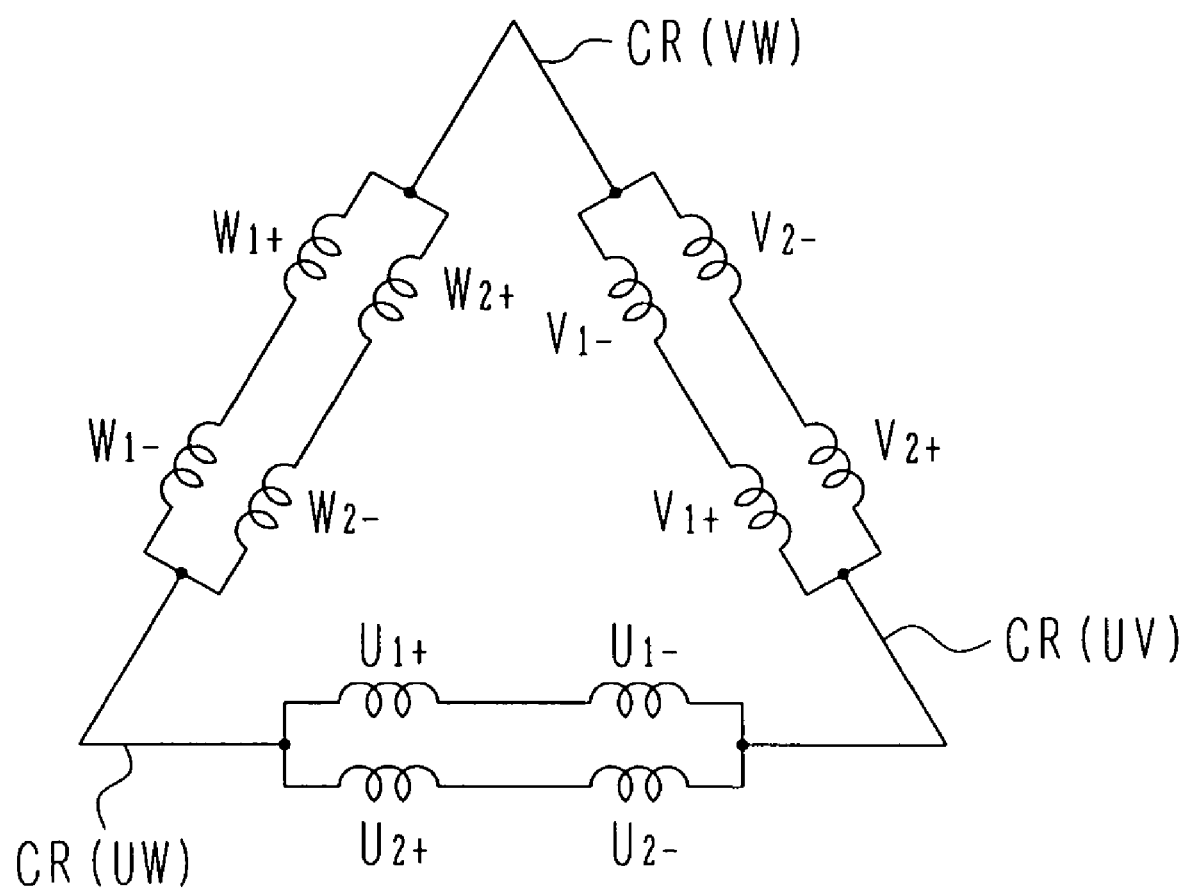
FIG. 5 is a connection diagram of stator coils in the motor for electric power steering according to the embodiment of the present invention.
Figure 6A:
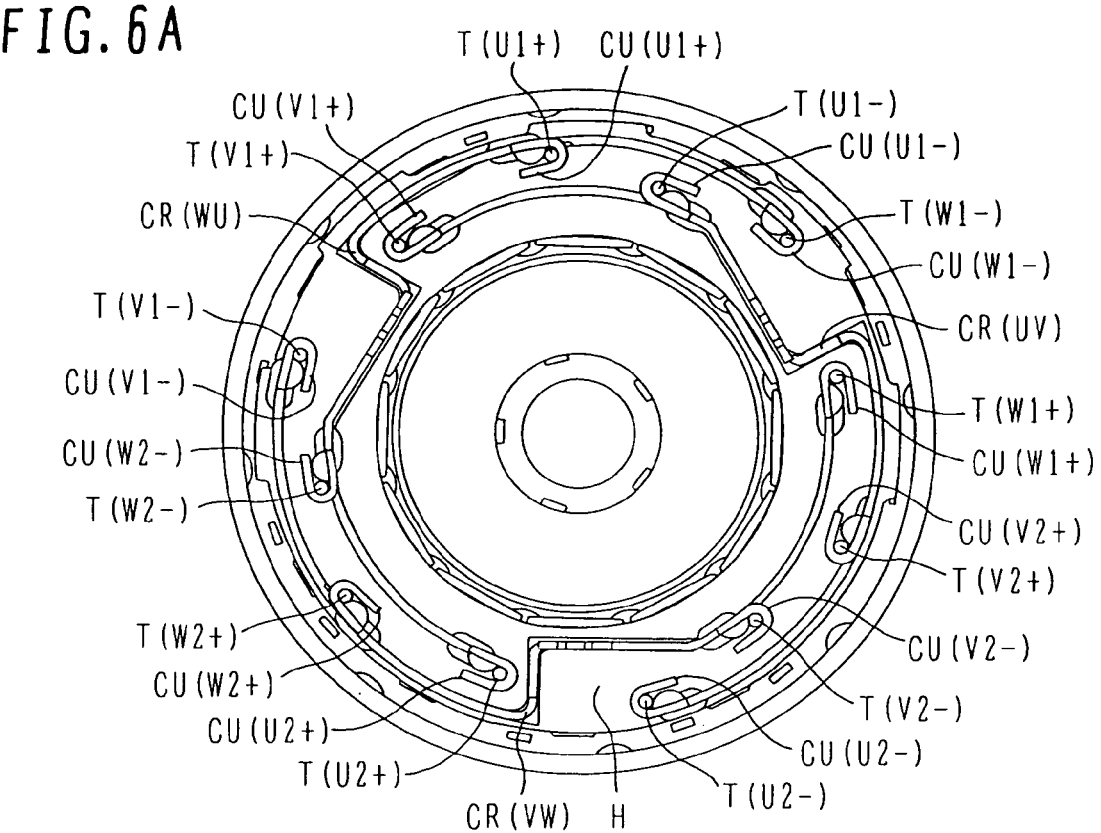
FIGS. 6A and 6B are each a side view showing the connection state of the stator coils in the motor for electric power steering according to the embodiment of the present invention.
Figure 6B:
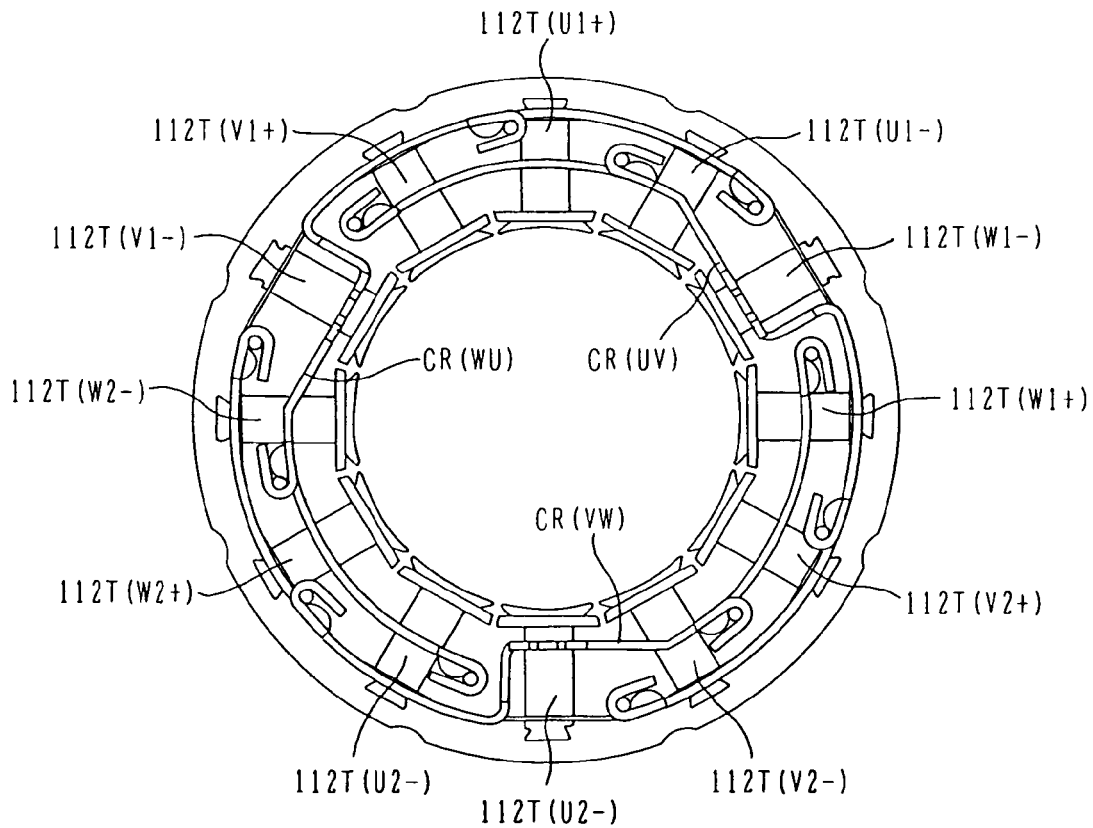

FIG. 5 is a connection diagram of the stator coils in the motor for electric power steering according to the embodiment. FIG. 6A is a side view showing the connection state of the stator coils in the motor for electric power steering according to the embodiment, and FIG. 6B is a side view showing the connection state of the stator coils with a holder H omitted from FIG. 6A. Additionally, FIG. 6A is a view looking from the line B-B in FIG. 1 in the direction of an arrow. Note that the same reference numerals as those in FIG. 2 denote the same components.

Figure 2:
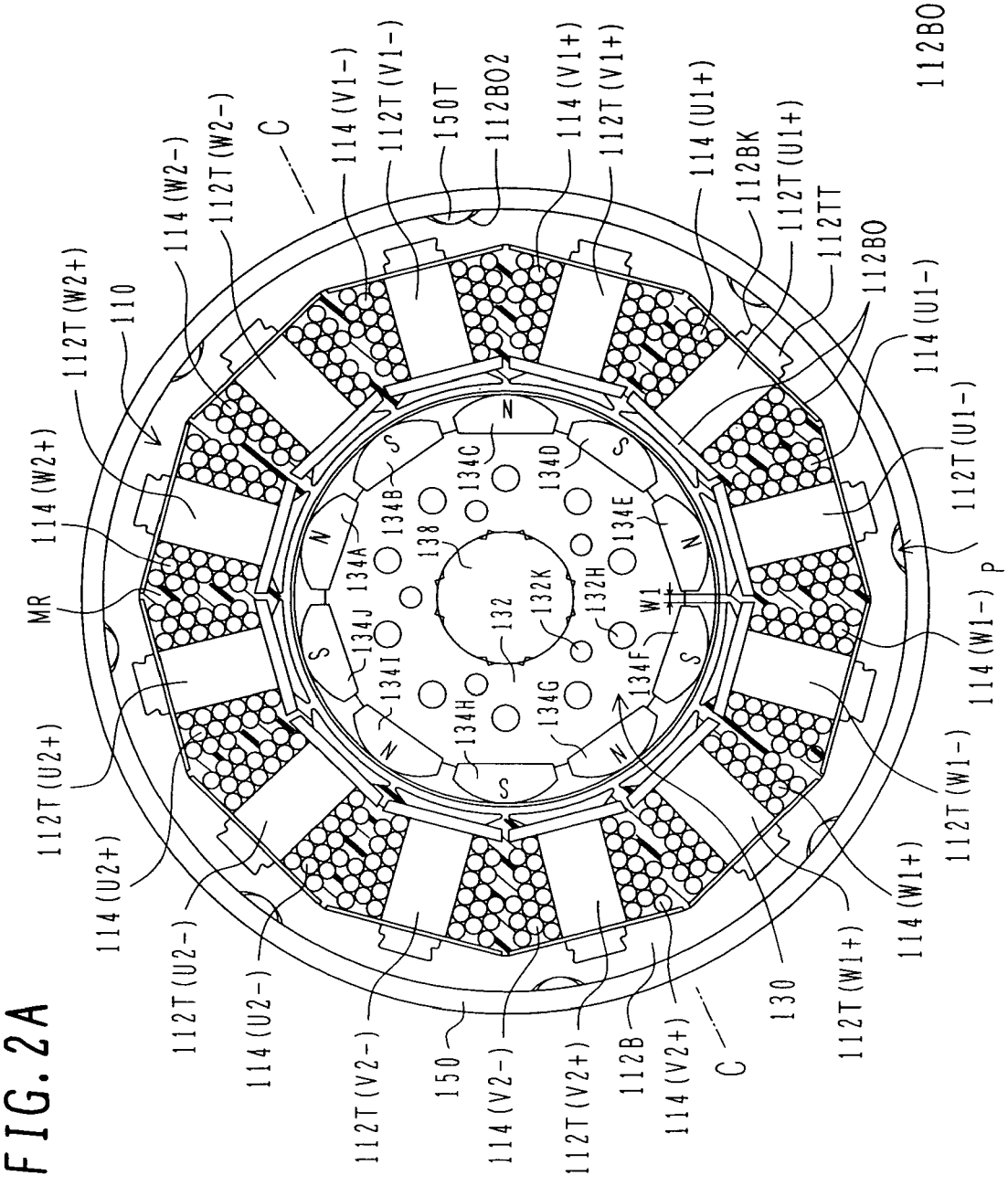
FIGS. 2A and 2B are an entire and partial sectional view taken along the line A-A in FIG. 1.

In FIG. 5, a coil U1+ represents the stator coil 114(U1+) shown in FIG. 2. Likewise, coils U1−, U2+, U2−, V1+, V1−, V2+, V2−, W1+, W1−, W2+ and W2− represent the stator coils 114(U1−), . . . , 114(W2−) shown in FIG. 2, respectively.

In the embodiment, the stator coils of the U-, V- and W-phases are interconnected in delta (Δ) connection. Also, the stator coils of each phase constitute a parallel circuit. Looking at the U-phase in more detail, a serial circuit of the coil U1+ and the coil U1− is connected in parallel to a serial circuit of the coil U2+ and the coil U2−. Here, the coil U1+ and the coil U1− are formed, as described above, by continuously winding a single wire. The other stator coils of the V- and W-phases are also connected in a similar way.

While star connection is also usable as another connection method, the delta connection is advantageous in reducing the terminal voltage as compared with the star connection. Assuming the voltage across the serial-parallel circuit of the U-phase to be E, for example, the terminal voltage is E in the case of the delta connection, but it is √3E in the case of the star connection. With a reduction of the terminal voltage, the number of turns of each coil can be increased and a wire having a smaller diameter can be used. Further, because of the coils constituting the parallel circuit, a current flowing through each coil can be reduced in comparison with the case of connecting the four coils in series. From this point of view as well, a wire having a smaller diameter can be used and an area occupancy rate can be increased. In addition, a thinner wire is more easily bendable and higher manufacturability is realized.

A manner of connecting the coils for three phases and for each phase using connecting rings will be described below with reference to FIGS. 5 and 6.

As shown in FIG. 5, the coils U1−, U2− and the coils V1+, V2+ are connected to each other by a connecting ring CR(UV). The coils V1−, V2− and the coils W1+, W2+ are connected to each other by a connecting ring CR(VW). The coils U1+, U2+ and the coils W1−, W2− are connected to each other by a connecting ring CR(UW). By connecting the coils in such a manner, the 3-phase delta connection can be constituted.

More specifically, the three connecting rings CR(UV), CR(VW) and CR(UW) are arranged as shown in FIGS. 6A and 6B. The connecting rings CR(UV), CR(VW) and CR(UW) are each formed by bending a bus-bar type connecting plate into a circular-arc shape so that a large current is allowed to flow through the connecting ring. The connecting rings have the same shape. For example, the connecting ring CR(UV) has a shape resulting from connecting a circular arc having a small diameter and a circular arc having a large diameter to each other. The other connecting rings CR(VW), CR(UW) are also constituted in the same way. The connecting rings CR(UV), CR(VW) and CR(UW) are held by a holder H at angular intervals of 120° in the circumferential direction. The relationships between the connecting rings CR(UV), CR(VW), CR(UW) and the holder H are will be described later with reference to FIGS. 7 and 8.

The connecting ring CR(UV) is connected at a caulked portion CU(V1+) thereof to an end T(V1+) of the stator coil 114(V1+), is connected at a caulked portion CU(U1−) thereof to an end T(U1−) of the stator coil 114(U1−), is connected at a caulked portion CU(V2+) thereof to an end T(V2+) of the stator coil 114 (V2+), and is connected at a caulked portion CU(U2−) thereof to an end T(U2−) of the stator coil 114 (U2−).

Similarly, the connecting ring CR(VW) is connected at a caulked portion CU(W1+) thereof to an end T(W1+) of the stator coil 114(W1+), is connected at a caulked portion CU(V2−) thereof to an end T(V2−) of the stator coil 114 (V2−), is connected at a caulked portion CU(W2+) thereof to an end T(W2+) of the stator coil 114(W2+), and is connected at a caulked portion CU(V1−) thereof to an end T(V1−) of the stator coil 114(V1−). Further, the connecting ring CR(WU) is connected at a caulked portion CU(U2+) thereof to an end T(U2+) of the stator coil 114(U2+), is connected at a caulked portion CU(W2−) thereof to an end T(W2−) of the stator coil 114(W2−), is connected at a caulked portion CU(U1+) thereof to an end T(U1+) of the stator coil 114(U1+), and is connected at a caulked portion CU(W1−) thereof to an end T(W1−) of the stator coil 114(W1−).

The stator coil end T(U1+) is one end of the stator coil 114(U1+) wound over the tooth 112T(U1+). The stator coil end T(U1−) is one end of the stator coil 114 (U1−) wound over the tooth 112T(U1−). Because the stator coil 114(U1+) and the stator coil 114(U1−) are formed by continuously winding a single wire as described above, the two stator coil ends T(U1+), T(U1−) are present for the two stator coils 114(U1+), 114(U1−). Similarly, the stator coil ends T(U2+), T(U2−), T(V1+), T(V1−), T(V2+), T(V2−), T(W1+), T(W1−), T(W2+) and T(W2−) are respective one ends of the stator coils 114(U2+), . . . , 114(W2+).

The stator coil ends T(U1−), T(U2−), T(V1+) and T(V2+) are interconnected by the connecting ring CR(UV), thereby establishing the connection between the coils U1−, U2− and the coils V1+, V2+ through the connecting ring CR(UV) as shown in FIG. 5. The stator coil ends T(V1−), T(V2−), T(W1+) and T(W2+) are interconnected by the connecting ring CR(VW), thereby establishing the connection between the coils V1−, V2− and the coils W1+, W2+ through the connecting ring CR(VW) as shown in FIG. 5. The stator coil ends T(W1−), T(W2−), T(U1+) and T(U2+) are interconnected by the connecting ring CR(UW), thereby establishing the connection between the coils U1+, U2+ and the coils W1−, W2− through the connecting ring CR(UW) as shown in FIG. 5.

Thus, since the connecting rings CR(UV), CR(VW) and CR (UW) of three phases have the same shape, only one type of mold is required and the mold cost can be cut.

The structure of the connecting rings used in the motor for electric power steering according to the embodiment will be described below with reference to FIGS. 7 and 8.

Figure 7:
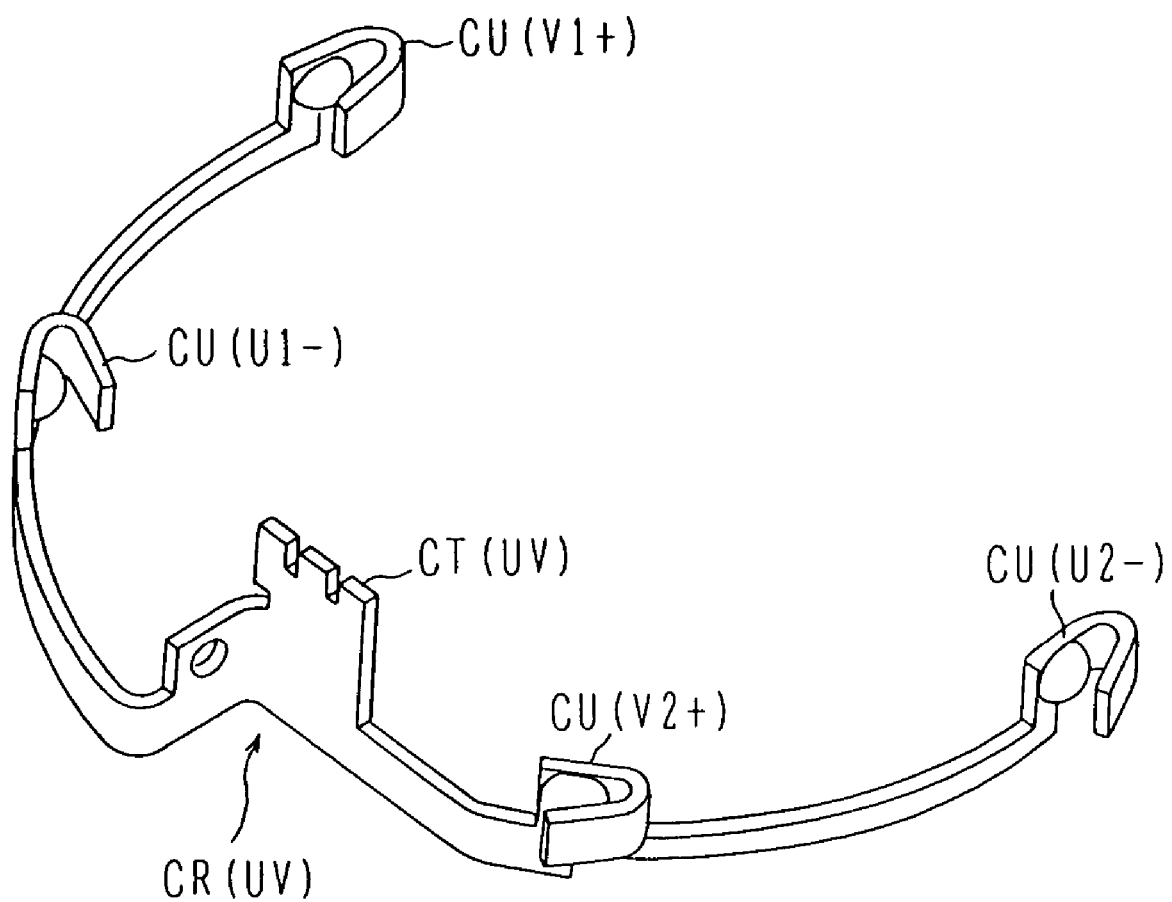
FIG. 7 is a perspective view showing the structure of a connecting ring used in the motor for electric power steering according to the embodiment of the present invention.

FIG. 7 is a perspective view showing the structure of the connecting ring used in the motor for electric power steering according to the embodiment. FIG. 8 is an exploded perspective view showing the relationship between the connecting rings and a holder used in the motor for electric power steering according to the embodiment. Note that the same reference numerals as those in FIG. 6 denote the same components.

Because the three connecting rings CR(UV), CR(VW) and CR (UW) have the same shape as mentioned above, FIG. 7 shows, by way of example, the connecting ring CR(UV).

As shown in FIG. 7, the connecting ring CR(UV) have four U-shaped caulked portions CU(V1+), CU(U1−), CU(V2+) and CU(U2−). Each caulked portion CU is electrically connected to the end of the stator coil 114 through fusing. Caulking, welding, brazing, soldering, etc. can be used to establish that electrical connection.

Also, a projection CT(UV) projecting in the axial direction of the motor is provided in a central portion of the connecting ring CR(UV). One end of a bus bar BB(U) is connected to the projection CT(UV) as described later. The caulked portions CU(V1+), CU(U1−) are provided on one side of the projection CT(UV), and the caulked portions CU(V2+), CU(U2−) are provided on the other side of the projection CT(UV).

A distal end of the projection CT(UV) is divided, as shown, into three small projections. As described later with reference to FIG. 9, one end of the bus bar BB on the side connected to the projection CT(UV) is also formed into a similar shape. That structure aims to reduce a heat amount required for welding and to stabilize the welding operation.

Figure 8:
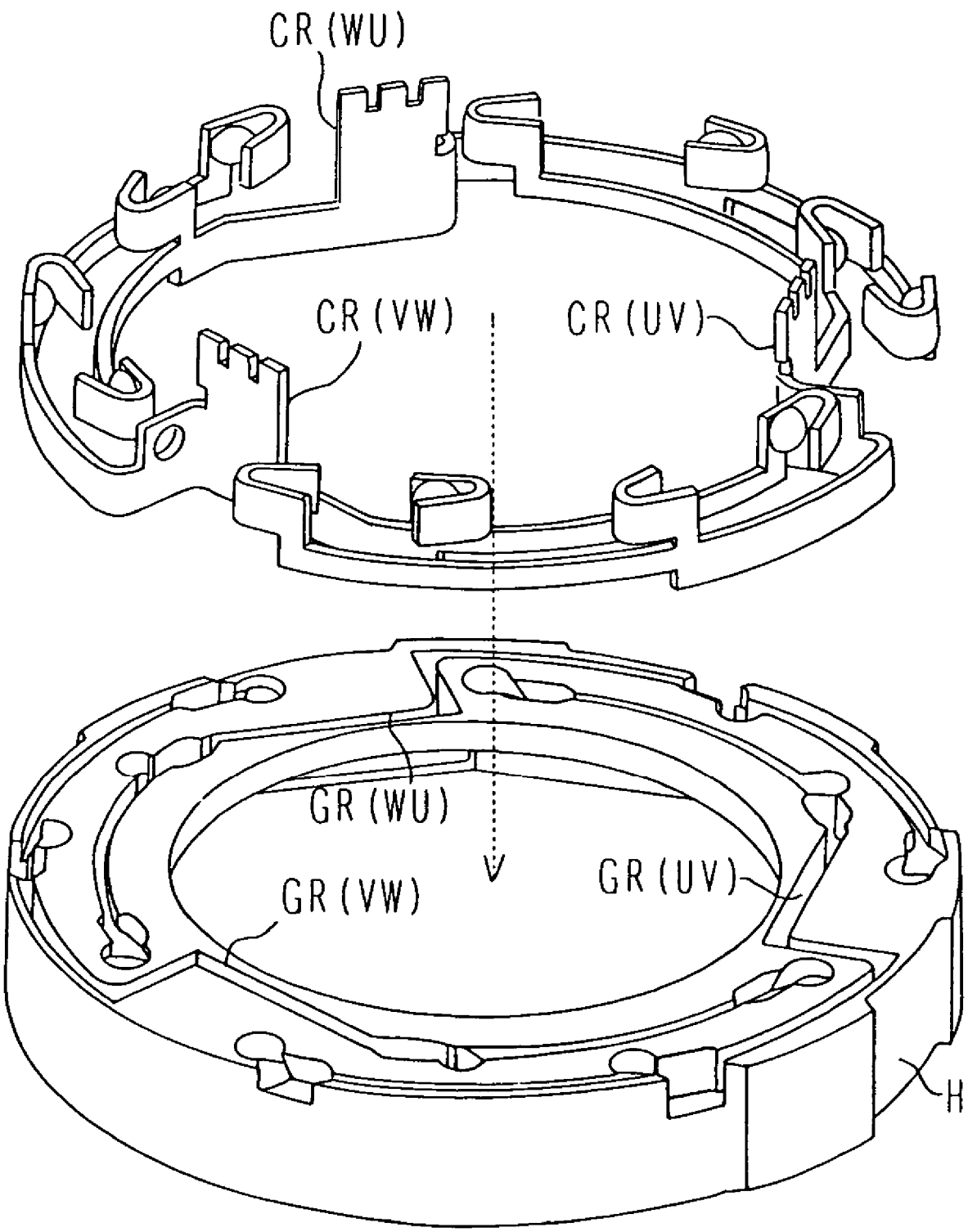
FIG. 8 is an exploded perspective view showing the relationship between connecting rings and a holder used in the motor for electric power steering according to the embodiment of the present invention.

As shown in FIG. 8, three grooves GR(UV), GR(VW) and GR(WU) are previously formed in the holder H made of a resin. The three grooves GR(UV), GR(VW) and GR(WU) formed in the holder H have the same shape and are formed in positions shifted from each other 120° in the circumferential direction. The three connecting rings CR(UV), CR(VW) and CR(UW) are accommodated in the three grooves GR(UV), GR(VW) and GR(WU), respectively, whereby the connecting rings are properly positioned.

Looking in the radial direction from the center of the motor (rotating electric machine), as shown in FIG. 6A, the U-shaped caulked portions CU are arranged such that one caulked portion is present in the same radial direction. Therefore, when each caulked portion CU is connected to the end of the stator coil 114 through fusing, the other caulked portions will not interfere with the fusing operation for the relevant caulked portion.

The structure of the bus bar used in the motor for electric power steering according to the embodiment will be described below with reference to FIGS. 9A and 9B.

Figure 9A:
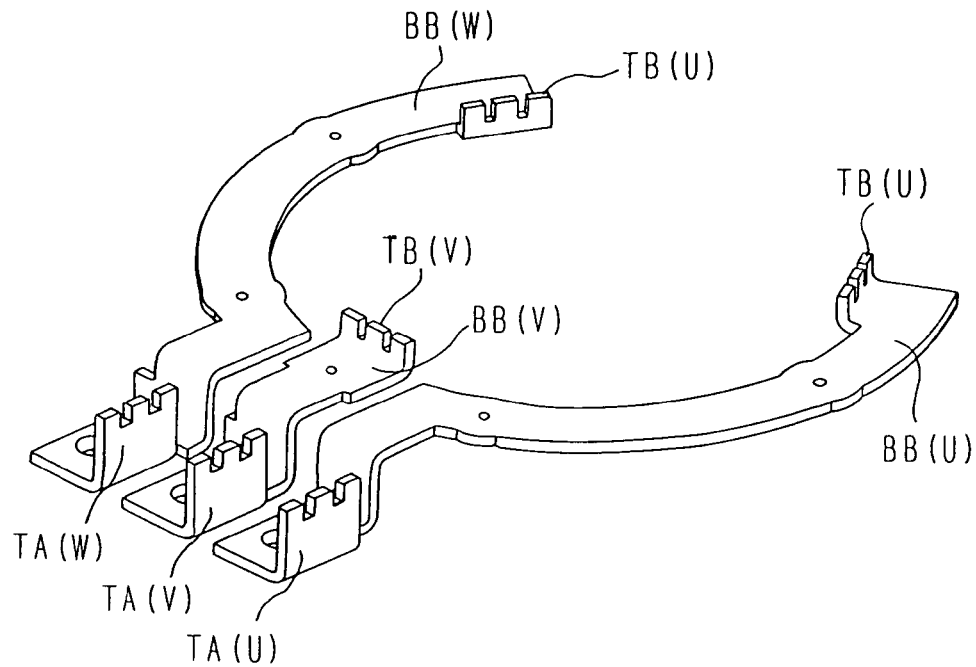
FIG. 9A is a perspective view showing the structure of conductors of a bus bar used in the motor for electric power steering according to the embodiment of the present invention.
Figure 9B:
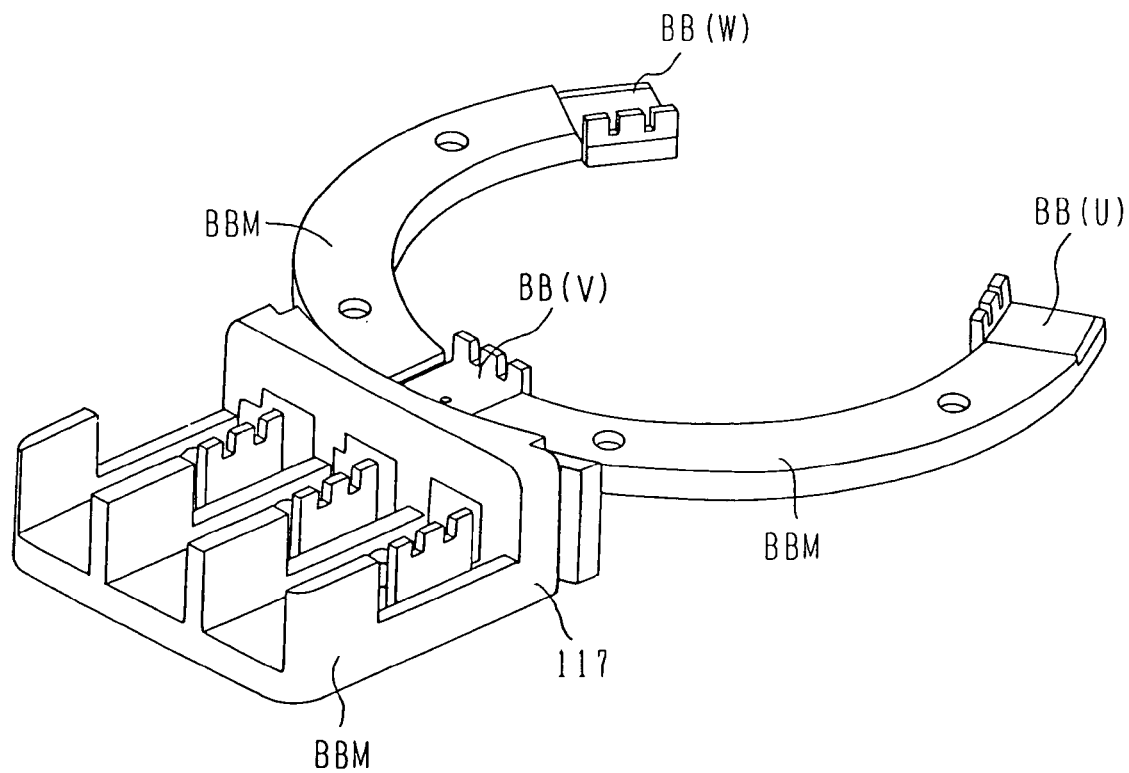
FIG. 9B is a perspective view showing the structure of the bus bar used in the motor for electric power steering according to the embodiment of the present invention.

FIG. 9A is a perspective view showing the structure of conductors of the bus bar used in the motor for electric power steering according to the embodiment, and FIG. 9B is a perspective view showing the structure of the bus bar used in the motor for electric power steering according to the embodiment.

As shown in FIG. 9A, bus bars BB(U), BB(V) and BB(W) are each fabricated by punching a conductive metallic plate made of, e.g., copper or a copper alloy, with a press. The bus bars BB(U), BB(V) and BB(W) have one ends TA(U), TA(V) and TA(W) and the other ends TB(U), TB(V) and TB(W), respectively. When the bus bars are arranged as shown, the one ends TA(U), TA(V) and TA(W) are positioned parallel to each other, while the other ends TB(U), TB(V) and TB(W) are positioned at angular intervals of 120°.

By embedding the bus bars BB(U), BB(V) and BB(W) in a molding BBM in the state where the bus bars are positioned as shown FIG. 9A, a bus bar 117 shown in FIG. 9B is obtained. The molding BBM is made of PPS in the embodiment, but other suitable material, such as PBT, is also usable.

The molding BBM serves to provide insulation among the bus bars BB(U), BB(V) and BB(W), insulation between the bus bars BB(U), BB(V), BB(W) and the connecting rings CR(UV), CR(VW), CR (UW), and insulation between the bus bars BB(U), BB(V), BB(W) and the yoke (frame) 150.

The other ends TB(U), TB(V) and TB(W) of the bus bars BB(U), BB(V) and BB(W) are welded respectively to the connecting rings CR(UV), CR(VW) and CR (UW) inside the yoke 150. The one ends TA(U), TA(V) and TA(W) of the bus bars BB(U), BB(V) and BB(W) are welded to the terminal 163 connected to the power cable 162 outside the motor. In addition to welding, any of caulking, brazing, screwing, connector joint, etc. is also usable for connecting the bus bars to the terminal 163.

By taking the wiring out of the yoke 150 with the use of the bus bars BB(U), BB(V) and BB(W), it is possible to attach the power cable 162 in a later step, and to make easier the operation of cutting the inner peripheries of the teeth.

The positional relationships among the stator core, the connecting rings, and the bus bar in the motor for electric power steering according to the embodiment will be described below with reference to FIG. 10.

Figure 10:
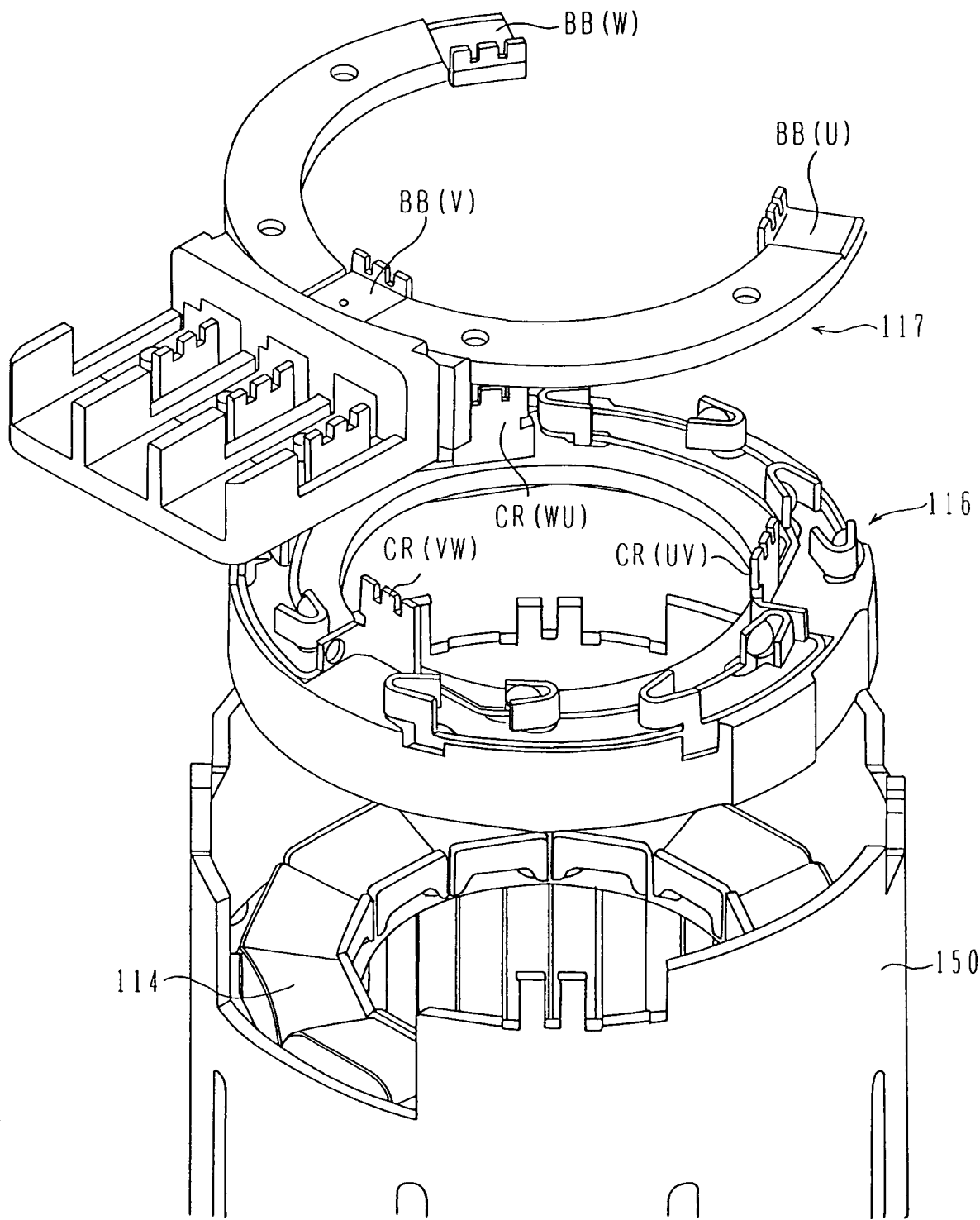
FIG. 10 is an exploded perspective view showing the positional relationships among a stator core, the connecting rings, and the bus bar in the motor for electric power steering according to the embodiment of the present invention.

FIG. 10 is an exploded perspective view showing the positional relationships among the stator core, the connecting rings, and the bus bar in the motor for electric power steering according to the embodiment. Note that the same reference numerals as those in FIGS. 6-9 denote the same components.

First, the stator coils 114 are connected to the connecting rings CR(UV), CR(VW) and CR (UW). Then, after inserting the stator coils 114 inside the yoke 150, the connecting rings CR(UV), CR(VW) and CR (UW) and the bus bars BB(U), BB(V) and BB(W) are connected to each other. Thus, the operation of connecting the connecting rings CR(UV), CR(VW) and CR (UW) and the bus bars BB(U), BB(V) and BB(W) is facilitated because it is carried out after the operation of connecting the stator coils 114 and the connecting rings CR(UV), CR(VW) and CR (UW).

After the above-described connecting operation is completed, the connecting rings CR(UV), CR(VW) and CR (UW), the holder H, and parts of the bus bars BB(U), BB(V) and BB(W) are molded together with the coil ends by using the molding material M1 (shown in FIG. 1).

The operation of connecting the connecting rings CR(UV), CR(VW) and CR (UW) and the bus bars BB(U), BB(V) and BB(W) is carried out after inserting the stator coils 114 in the yoke 150. Accordingly, the connecting operation is interfered unless the positions of connecting portions between the connecting rings CR(UV), CR(VW) and CR (UW) and the bus bars BB(U), BB(V) and BB(W) (i.e., the positions of the projections CT(UV), CT(VW) and CT(WU) of the connecting rings CR(UV), CR(VW) and CR (UW) and the other ends TB(U), TB(V) and TB(W) of the bus bars BB(U), BB(V) and BB(W)) are away from the position of the yoke 150. In the embodiment, since the projections CT(UV), CT(VW) and CT(WU) of the connecting rings CR(UV), CR(VW) and CR (UW) are positioned offset radially inward as shown in FIG. 7 and a large radial distance is secured between those projections and the yoke 150 as shown in FIG. 6, there occurs no interference with the connecting operation.

Figure 11:
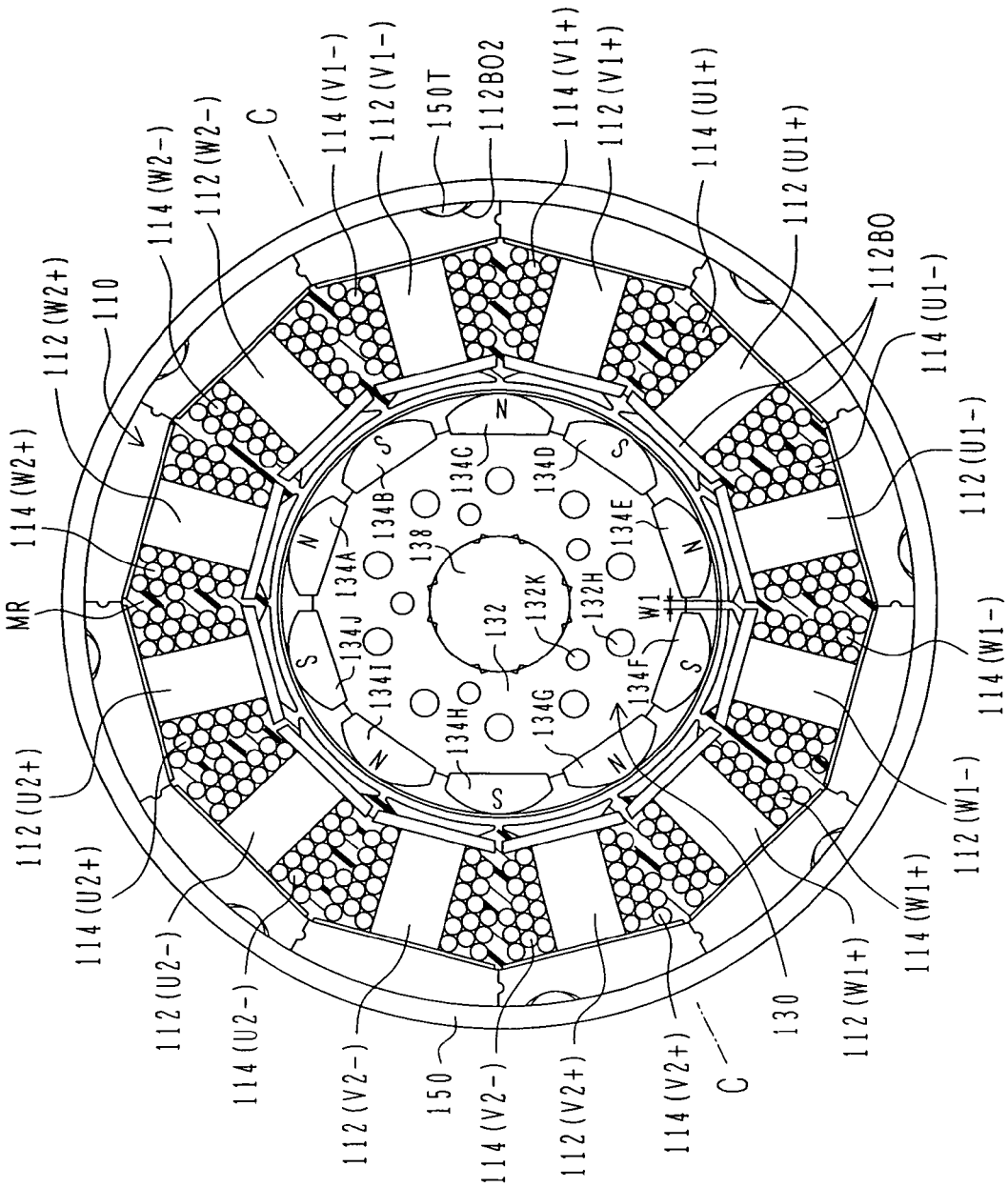
FIG. 11 is a sectional view, taken along the line A-A in FIG. 1, showing another structure of a stator.

Another example of the structure of the stator 110 will be described below with reference to FIG. 11. FIG. 11 is a sectional view taken along the line A-A in FIG. 1. Note that the same reference numerals as those in FIG. 2 denote the same components.

In the stator 110 shown in FIG. 2, the stator core 112 is made up of the annular back core 112B and the plurality of teeth 112T separate from the back core 112B. In contrast, the stator core 112 in this example is made up of twelve T-shaped teeth-including split back cores 112(U1+), 112(U1−), 112 (U2+), 112(U2−), 112(V1+), 112(V1−), 112(V2+), 112(V2−), 112(W1+), 112(W1−), 112(W2+) and 112(W2−). Stated another way, the annular back core 112B in FIG. 2 is split into 12 pieces in the circumferential direction. Then, a tooth is formed integrally with each of the split back cores. The teeth-including split back cores 112(U1+), ..., 112 (W2−) are each fabricated by punching sheets made of a magnetic substance, e.g., silicon steel sheets, by pressing, and then laminating the punched sheets in multiple layers. Incidentally, a rotor 130 has the same structure as that shown in FIG. 2.

In teeth portions of the teeth-including split back cores 112(U1+), ..., 112(W2−), as in FIG. 2, stator coils 114(U1+), 114(U1−), 114(U2+), 114(U2−), 114(V1+), 114(V1−), 114 (V2+), 114(V2−), 114(W1+), 114(W1−), 114(W2+) and 114 (W2−) are wound respectively over twelve independent teeth 112T(U1+), ..., 112T(W2−) in a concentrated winding way. The winding direction, etc. of the stator coils 114(U1+), ..., 114(W2−) are the same as those in FIG. 2.

The stator 110 is fabricated as follows. The stator coils 114(U1+), ..., 114(W2−) are wound respectively over the teeth-including split back cores 112(U1+), ..., 112(W2−). Then, recesses and projections, which are engageable with each other and formed in circumferential opposite end surfaces of each of the teeth-including split back cores 112 (U1+), ..., 112(W2−), are press-fitted in a successive manner, whereby the stator 110 is assembled. Subsequently, in a state where the back core 112B is press-fitted at plural points on the outer periphery thereof into the inner periphery of the frame 150, the stator core 112 and the stator coils 114 are integrally molded with a thermosetting resin MR to constitute a stator SubAssy. While, in this example, the stator core 112 and the stator coils 114 are integrally molded with the resin in the state where the assembly obtained by assembling the stator coils 114 in the stator core 112 is press-fitted into the frame 150, the stator core 112 and the stator coils 114 may be integrally molded with the resin in the state where the stator coils 114 are assembled in the stator core 112, followed by press-fitting the stator core 112 into the frame 150.

The molding process using a molding material (resin) is carried out as follows. A jig (not shown) is mounted to a structure comprising the stator core 112 and the frame 150 such that the stator core 112 and the coil ends of the stator coils 114 axially projecting from the axial ends of the stator core 112 are surrounded by the jig (not shown) and the frame 150. The molding material in a fluid state is poured into a space surrounded by the jig (not shown) and the frame 150, causing the molding material to fill into areas around the coil ends, gaps in the stator core 112, gaps in the stator coils 114, gaps between the stator core 112 and the stator coils 114, and a gap between the stator core 112 and the frame 150. The molding material is then hardened. After the molding material has been hardened, the jig (not shown) is removed.

An inner peripheral surface of the molded stator SubAssy, i.e., fore end surfaces of the teeth portions of the teeth-including split back cores 112(U1+), ..., 112(W2−) which are positioned to radially face the rotor 130, are subjected to cutting. The cutting reduces variations of the gap between the stator 110 and the rotor 130 and improves the roundness of the stator 110 at the inner diameter. Also, the above-described integral molding is effective in increasing release of heat generated upon supply of currents to the stator coils 114 in comparison with the case not performing the integral molding. Further, the integral molding is effective in preventing vibrations of the stator coils and the teeth. In addition, by cutting the inner periphery of the stator after the molding process, the cogging torque attributable to the stator roundness at the inner diameter can be reduced. The reduced cogging torque improves a steering feel in the steering operation.

Projections 150T are formed on the inner peripheral surface of the frame 150. Recesses 112BO2 are formed in the outer peripheral surface of the back core 112B corresponding to the projections 150T. As described above with reference to FIG. 2B, each projection 150T and each recess 112BO2 define an interface portion IP where the projection 150T and the recess 112BO2 having different curvatures engage with each other. Each number 8 of projections 150T and recesses 112BO2 are formed continuously in the axial direction at angular intervals in the circumferential direction. The interface portion IP serves also as a press-fitting portion. In other words, when the stator core 112 is fixed to the frame 150, the recesses 112BO2 of the back core 112B are press-fitted to the projections 150T of the frame 150 such that projected end surfaces of the projections 150T and bottom surfaces of the recesses 112BO2 are held in contact pressure with each other in the interface portions. Thus, in the embodiment, the stator core 112 is fixed to the frame 150 by partial press fitting. With the partial press fitting, a small gap is formed between the frame 150 and the stator core 112. In the embodiment, therefore, when the stator core 112 and the stator coils 114 are molded with a molding material (resin) MR, the molding material MR is filled into the small gap between the frame 150 and the stator core 112 at the same time. Additionally, the interface portions IP serve as rotation stoppers for preventing the stator core 112 from rotating relative to the frame 150 in the circumferential direction.

As described above, in the embodiment, since the stator core 112 is partially press-fitted to the frame 150, it is possible to increase slippage between the frame 150 and the stator core 112, and to reduce the rigidity. As a result, the embodiment can increase the effect of attenuating noises caused between the frame 150 and the stator core 112. Further, in the embodiment, since the molding material is filled in the gap between the frame 150 and the stator core 112, the effect of attenuating noises is further increased.

Alternatively, the projections 150T and the recesses 112BO2 may be held not contact with each other to serve only as the rotation stoppers, while the outer peripheral surface of the back core 112B may be press-fitted to the inner peripheral surface of the frame 150 in portions other than the projections 150T and the recesses 112BO2.

The above description was made of the EPS motor of 10 poles and 12 slots. The following description is made of the EPS motors of 8 poles-9 slots and 10 poles-9 slots according to the embodiment, which are indicated by the leftward-down oblique hatches in FIG. 3.

As compared with the AC motor of 6 poles and 9 slots, a higher utilization factor of magnetic flux can be obtained with the motors of 8 poles-9 slots and 10 poles-9 slots. More specifically, the utilization factor (kw·ks) of the magnet-producing magnetic flux in the AC motor of 6 poles and 9 slots is "0.83" as described above. On the other hand, because the motors of 8 poles-9 slots and 10 poles-9 slots have a winding coefficient kw of 0.95 and a skew coefficient ks of 1.00, the utilization factor (kw·ks) of the magnet-producing magnetic flux is "0.95". Thus, the motors of 8 poles-9 slots and 10 poles-9 slots according to the embodiment can increase the utilization factor (kw·ks) of the magnet-producing magnetic flux.

Also, the cycle of cogging torque is given by the least common multiple of the number of poles P and the number of slots S. Therefore, the cycle of cogging torque is "18" in the AC motor of 6 poles and 9 slots, while it is "72" or more in the motors of 8 poles-9 slots and 10 poles-9 slots. As a result, the cogging torque can be reduced in the motors of the embodiment.

Further, the cogging torque caused by errors in the stator roundness at the inner diameter can be reduced. More specifically, when the cogging torque caused by errors in the stator roundness at the inner diameter is assumed to be "3.7" in the AC motor of 6 poles and 9 slots, it is "1.4" in the motors of 8 poles-9 slots and 10 poles-9 slots. As a result, the motors of the embodiment can reduce the cogging torque caused by errors in the stator roundness at the inner diameter. Moreover, in the embodiment, since the stator roundness at the inner diameter is improved by cutting the inner peripheral surface of the molded stator SubAssy, it is possible to further reduce the cogging torque caused by errors in the stator roundness at the inner diameter.

Incidentally, in the motors of 8 poles-9 slots and 10 poles-9 slots, the circuit arrangement has to be modified. Looking at the U-phase, for example, those motors cannot employ parallel connection of the serial circuit of the coils U1+, U1– and the serial circuit of the coils U2+, U2– as in the EPS motor of 10 poles and 12 slots described above with reference to FIG. 5. Therefore, the coils U1+, U1–, U2+ and U2– must be connected in series.

The construction of an electric power steering system using the motor for electric power steering according to the embodiment will be described below with reference to FIG. 12.

Figure 12:
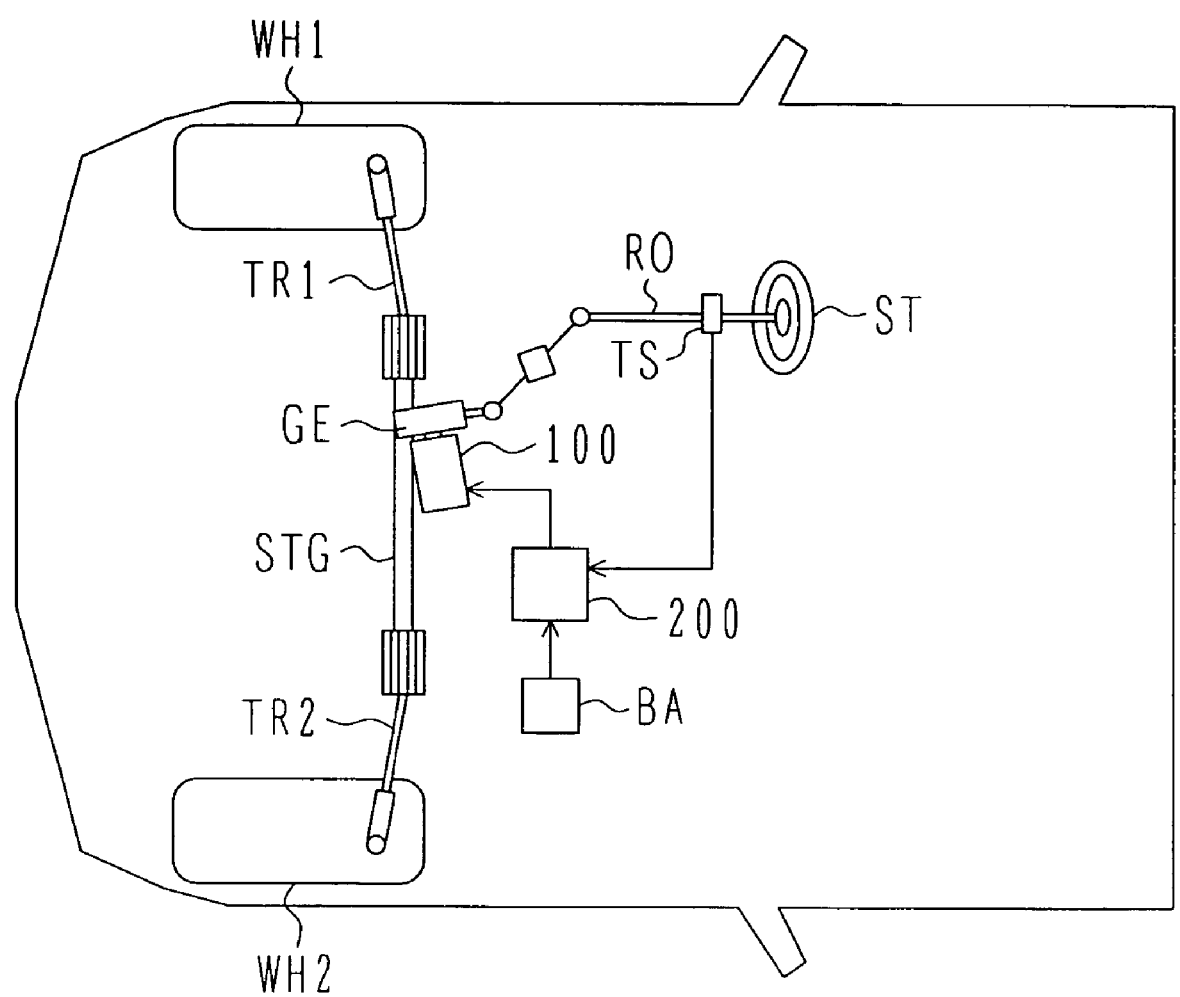
FIG. 12 is a schematic view showing the construction of an electric power steering system using the motor for electric power steering according to the embodiment of the present invention.

FIG. 12 is a schematic view showing the construction of the electric power steering system using the motor for electric power steering according to the embodiment.

When a driver rotates a steering wheel ST, an applied rotatory driving force is transmitted to a manual steering gear STG through a rod RO. After speed reduction in the manual steering gear STG, the driving force is transmitted to left and right rods TR1, TR2 and then to left and right wheels WH1, WH2. The left and right wheels WH1, WH2 are thereby steered.

The EPS motor 100 of the embodiment is mounted near the manual steering gear STG, and its driving force is transmitted to the manual steering gear STG through a gear GE. A torque sensor TS is attached to the rod RO and detects a rotatory driving force (torque) applied to the steering wheel ST. Based on an output of the torque sensor TS, a control unit 200 controls a current supplied to the EPS motor 100 so that the output torque of the EPS motor 100 is held at target torque. Electric power for the control unit 200 and the EPS motor 100 is supplied from a battery BA.

When the above-described arrangement is adapted for a rack type power steering system including the EPS motor disposed near a rack-and-pinion gear, the EPS motor 100 of the embodiment is also similarly applicable to a column type power steering system including the EPS motor disposed near a steering column.

The configuration of the control unit for controlling the motor for electric power steering according to the embodiment will be described below with reference to FIGS. 13-16.

Figure 13:
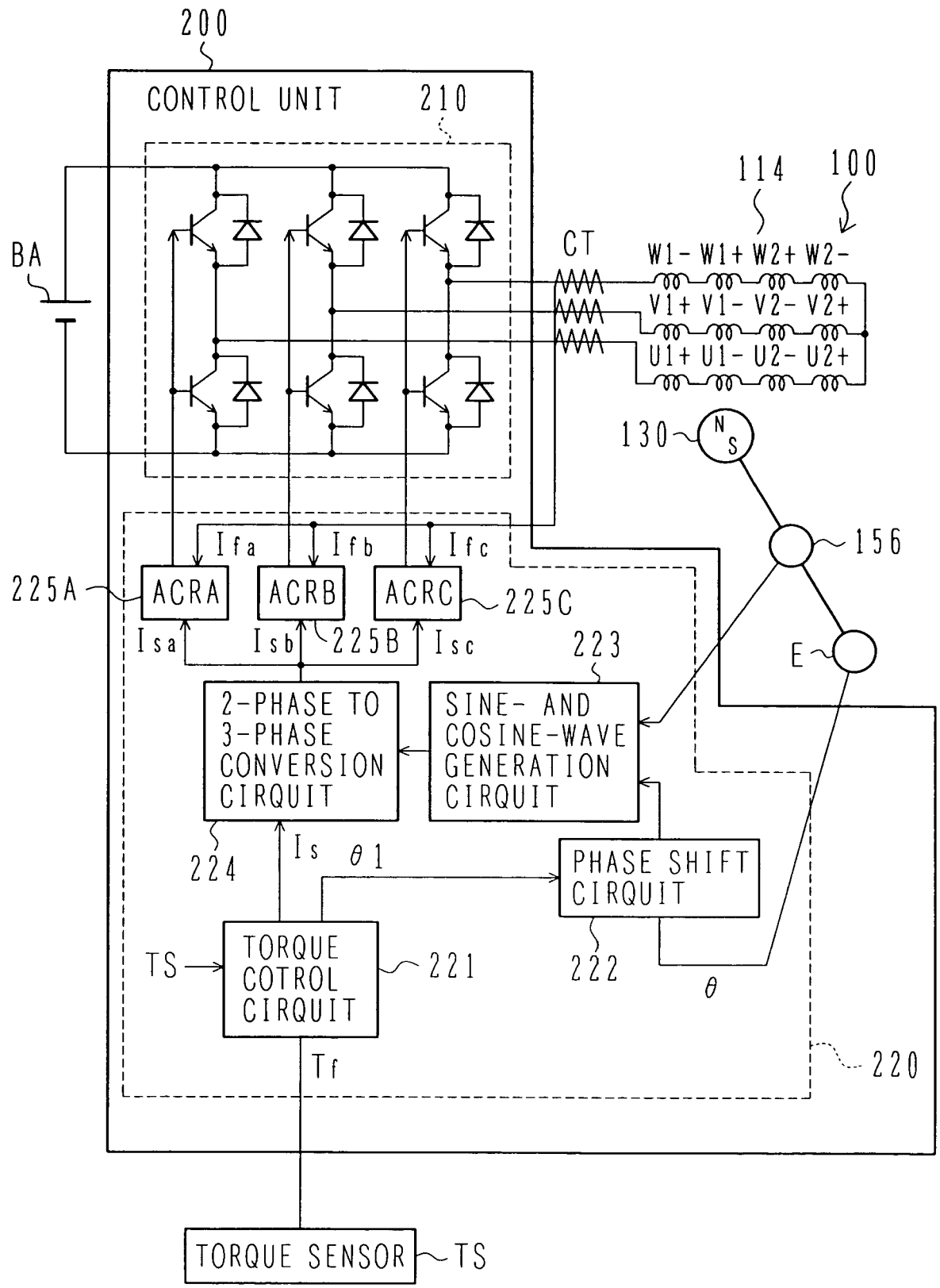
FIG. 13 is a functional block diagram showing the configuration of a control unit for controlling the motor for electric power steering according to the embodiment of the present invention.

FIG. 13 is a functional block diagram showing the configuration of the control unit for controlling the motor for electric power steering according to the embodiment.

As shown in FIG. 13, the control unit 200 comprises a power module 210 functioning as an inverter, and a control module 220 for controlling the power module 210. A DC voltage from the battery BT is converted to a 3-phase AC voltage by the power module 210 functioning as an inverter, and the 3-phase AC voltage is supplied to the stator coils 114 of the EPS motor 100.

A torque control circuit 221 in the control module 220 calculates torque Te based on both target torque Ts and torque Tf, which is applied from the steering wheel ST and detected by the torque sensor TS, and then outputs torque commands, i.e., a current command Is and a rotation angle $\theta 1$ of the rotor 130 through PI control (P: proportion and I: integration), etc. of the calculated torque Te.

A phase shift circuit 222 receives pulses from an encoder E, i.e., rotor position information $\theta$, and outputs it after making a phase shift in accordance with the command for the rotation angle $\theta 1$ from the torque control circuit (ASR) 221. A sine- and cosine-wave generation circuit 223 generates a sine-wave output obtained by making a phase shift of the voltage induced in each of windings (3-phase in the embodiment) of the stator coils 114 based on both information from the resolver 156 for detecting the permanent magnet pole position in the rotor 130 and the rotor position information $\theta$ obtained from the phase shift circuit 222 after a phase shift. Incidentally, the amount of the phase shift may be set to zero.

Based on the current command Is from the torque control circuit (ASR) 221 and the output of the sine- and cosine-wave generation circuit 223, a 2-phase to 3-phase conversion circuit 224 outputs current commands Isa, Isb and Isc corresponding to respective phases. Current control systems (ACR) 225A, 225B and 225C are disposed for the respective phases in one-to-one relation and sends signals, which depend on both the current commands Isa, Isb and Isc and current detected values Ifa, Ifb and Ifc from current detectors CT, to the inverter 210, thereby controlling the currents of the respective phases. In this case, the resultant current of each phase is always formed in a position perpendicular to the field flux or a phase-shifted position.

The structure of the control unit for controlling the motor for electric power steering according to the embodiment will be described below with reference to FIG. 14.

Figure 14:
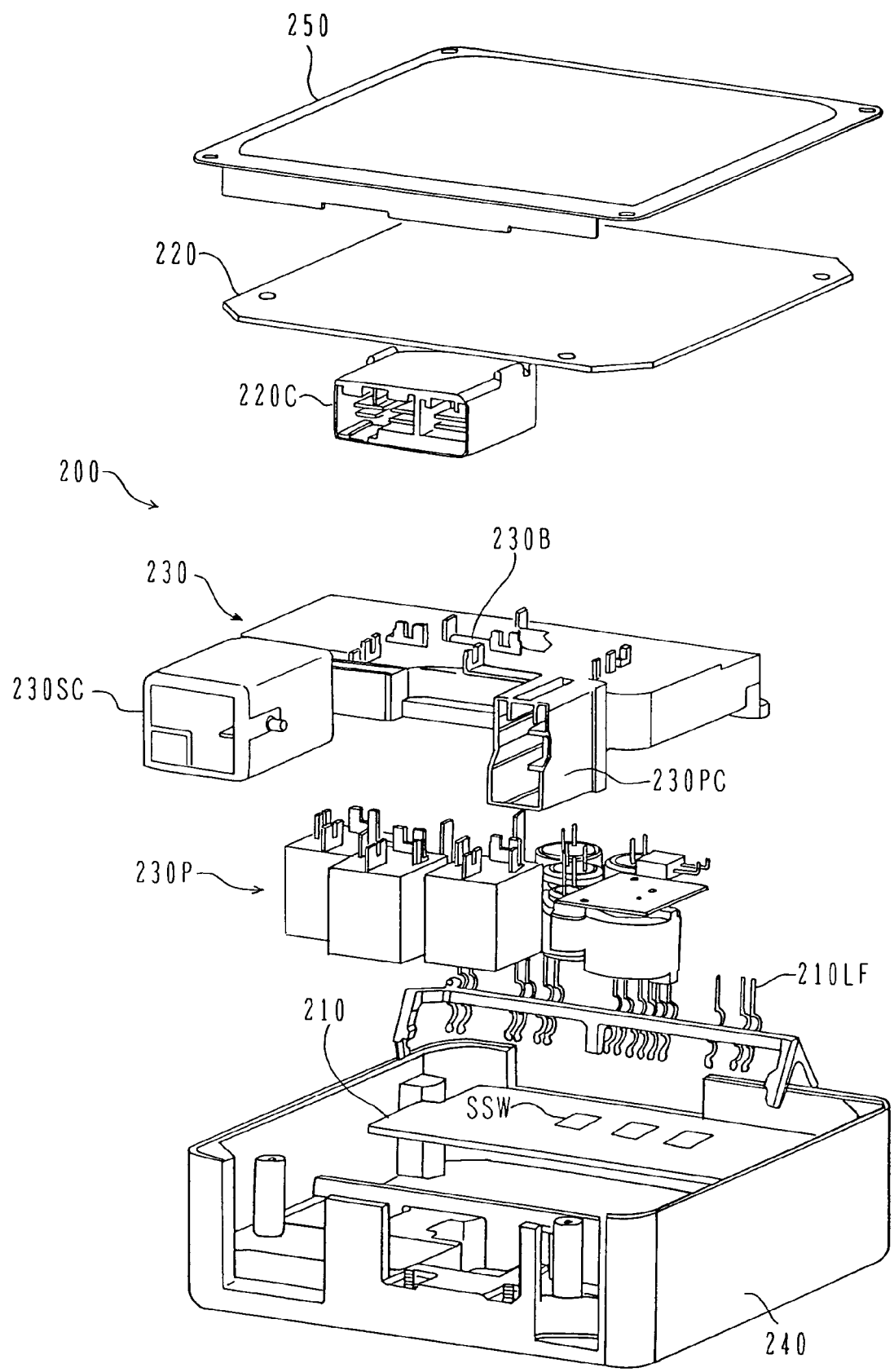
FIG. 14 is an exploded perspective view showing the structure of the control unit for controlling the motor for electric power steering according to the embodiment of the present invention.

FIG. 14 is an exploded perspective view showing the structure of the control unit for controlling the motor for electric power steering according to the embodiment.

As shown in FIG. 14, the motor control unit 200 comprises the power module 210, the control module 220, a conductor module 230, a casing 240 and a shield cover 250.

The power module 210 is constructed such that a wiring pattern is formed on a metallic board with insulators interposed between them, and semiconductor switching devices SSW, e.g., MOSFETs (Field Effect Transistors) shown in FIG. 13, are mounted on the wiring pattern. Respective one ends of a plurality of lead frames 210LF are fixed to the power module 210 by soldering. The lead frames 210LF are used for electrical connection between the power module 210 and the control module 220.

The control module 220 includes a CPU, a driver circuit, etc. which are mounted on a PCB board. In the illustrated state, the CPU, the driver circuit, etc. are mounted on the underside of the board. Further, a signal connector 220C is mounted to the control module 220.

The conductor module 230 includes bus bars 230B that are integrally molded and serve as power lines. At the same time as the molding of the bus bars, a motor connector 230SC serving as a terminal for supplying the motor currents to the motor and a power supply connector 230PC supplied with power from the battery are also integrally molded. Further, parts 230P, such as relays, coils and capacitors, are mounted on the conductor module 230 in advance. Terminals of the parts 230P are connected to the bus bars 230B by TIG (Tungsten-Inert-Gas) welding (arc welding).

The casing 240 is made of aluminum. In assembly, the power module 210 and the conductor module 230 are fixed in the casing 240 by screwing. Then, the control module 220 is similarly fixed in the casing 240 by screwing at a position above the power module 210 and the conductor module 230. Then, the respective other ends of the lead frames 210LF are connected to the corresponding terminals of the control module 220 by soldering. Finally, the shield cover 250 is fixed in place by screwing, whereby the motor control unit 200 is manufactured.

Figure 15:
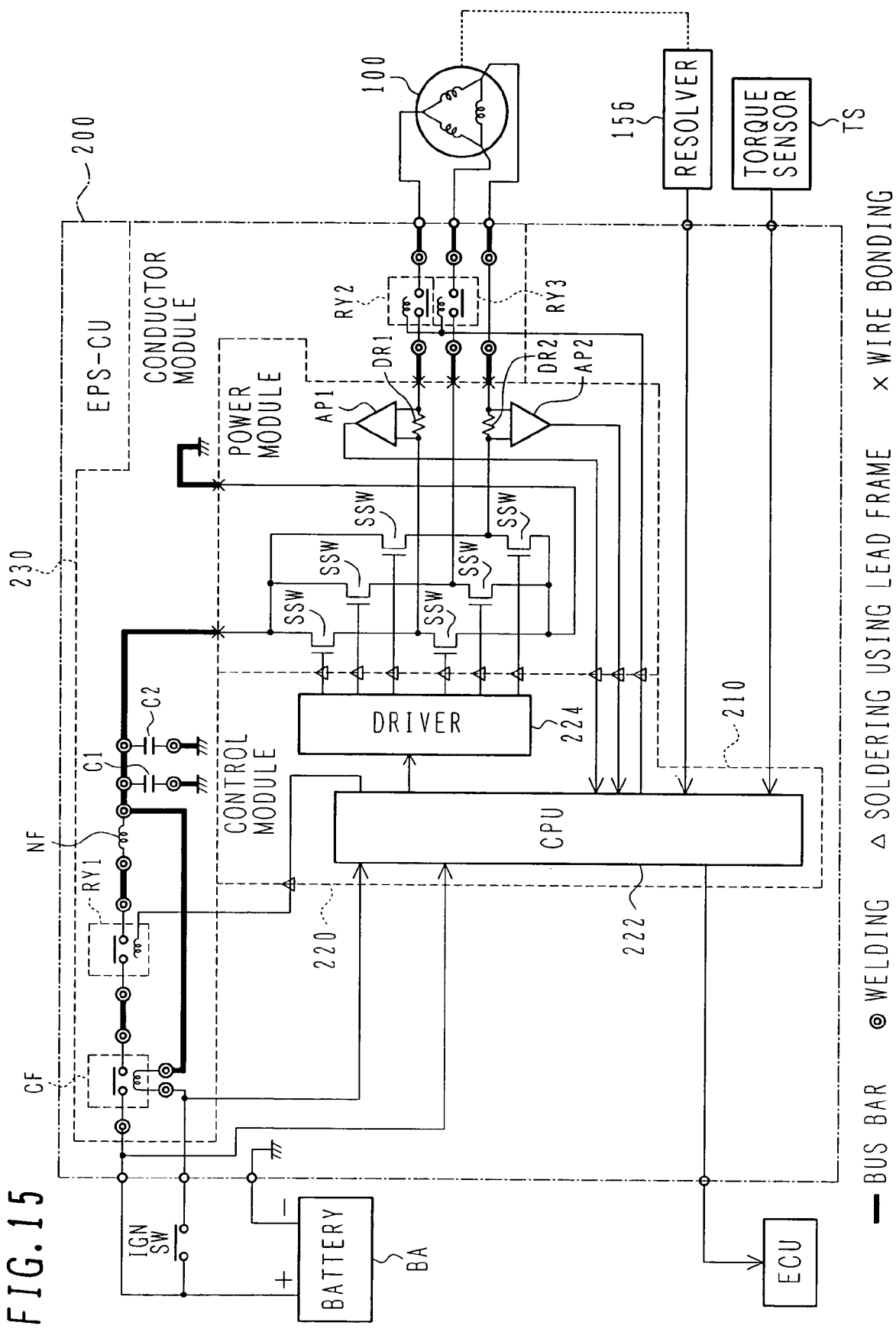
FIG. 15 is a circuit diagram showing the circuit configuration of the control unit for controlling the motor for electric power steering according to the embodiment of the present invention.

FIG. 15 is a circuit diagram showing the circuit configuration of the control unit for controlling the motor for electric power steering according to the embodiment of the present invention. Note that the same reference numerals as those in FIG. 14 denote the same components.

In the illustrated diagram, the motor control unit 200 includes the power module 210, the control module 220, and the conductor module 230.

In the conductor module 230, the bus bars 230B (see FIG. 14) serving as power lines are integrally molded. In FIG. 15, thick solid lines represent the bus bars. In the conductor module 230, as shown, a common filter CF, a normal filter NF, ceramic capacitors CC1, CC2, and a relay RY1 are connected to the bus bars that connect the battery BA, i.e., the power supply, to respective collector terminals of the semiconductor switching devices SSW, e.g., IGBTs, in the power module 210.

Also, a double circle in FIG. 15 represents a portion connected by welding. For example, four terminals of the common filter CF are connected to terminals of the bus bars by welding. Similarly, two terminals of the normal filter NF, two terminals of each of the ceramic capacitors CC1, CC2, and two terminals of the relay RY1 are connected to corresponding terminals of the bus bars by welding. The common filter CF and the normal filter NF serve to prevent radio noises.

Further, the bus bars are used in wiring to supply motor currents from the power module 210 to the motor 100. Relays RY2, RY3 are connected by welding to the wiring of the bus bars extended from the power module 210 to the motor 100. The relays RY1, RY2 and RY3 are disposed for the purpose of failsafe to cut off the supply of power to the motor in the event that an abnormality occurs in the motor, the control module, etc.

The control module 220 includes a CPU 222 and a driver circuit 224. The CPU 222 produces, based on the torque detected by the torque sensor TS and the rotational position of the motor 100 detected by the resolver 156, control signals for executing on/off control of the semiconductor switching devices SSW in the power module 210, and then outputs the control signals to the driver circuit 224. In accordance with the control signals supplied from the CPU 222, the driver circuit 224 performs on/off-driving of the semiconductor switching devices SSW in the power module 210. The motor currents supplied from the power module 210 to the motor 100 are detected by motor current detecting resistances (shunt resistances) DR1, DR2. The detected motor currents are amplified by amplifiers AP1, AP2 and are inputted to the CPU 222. The CPU 222 executes feedback control so that the motor currents are held at target values. The CPU 222 is connected to an external engine control unit ECU and so on via, e.g., a CAN (Controlled Area Network) or the like for transfer of information.

In FIG. 15, a mark Δ represents a portion connected by soldering using a lead frame. The use of the lead frame provides a structure capable of relieving stresses. The shape, etc. of the lead frame is described in FIG. 14. Electrical connections of the control module 220 to the power module 210 or the conductor module 230 are established by soldering using the lead frames.

The power module 210 includes 6 semiconductor switching devices SSW, e.g., IGBTs. Three pairs of the semiconductor switching devices SSW are connected in series per pair for each of three phases (U-, V- and W-phases) to constitute upper and lower arms. In FIG. 15, a mark x represents a portion electrically connected by wire bonding. When the motor currents are supplied from the power module 210 to the motor 100 via the bus bars in the conductor module 230, those motor currents flow as a large current of, e.g., 100 A. The wire bonding is therefore employed as the structure capable of not only accommodating flow of the large current, but also relieving stresses. Details of the connected portions by the wire bonding will be described below with reference to FIG. 16. Source power supply lines and grounding lines are also connected to the semiconductor switching devices SSW by the wire bonding.

Figure 16:
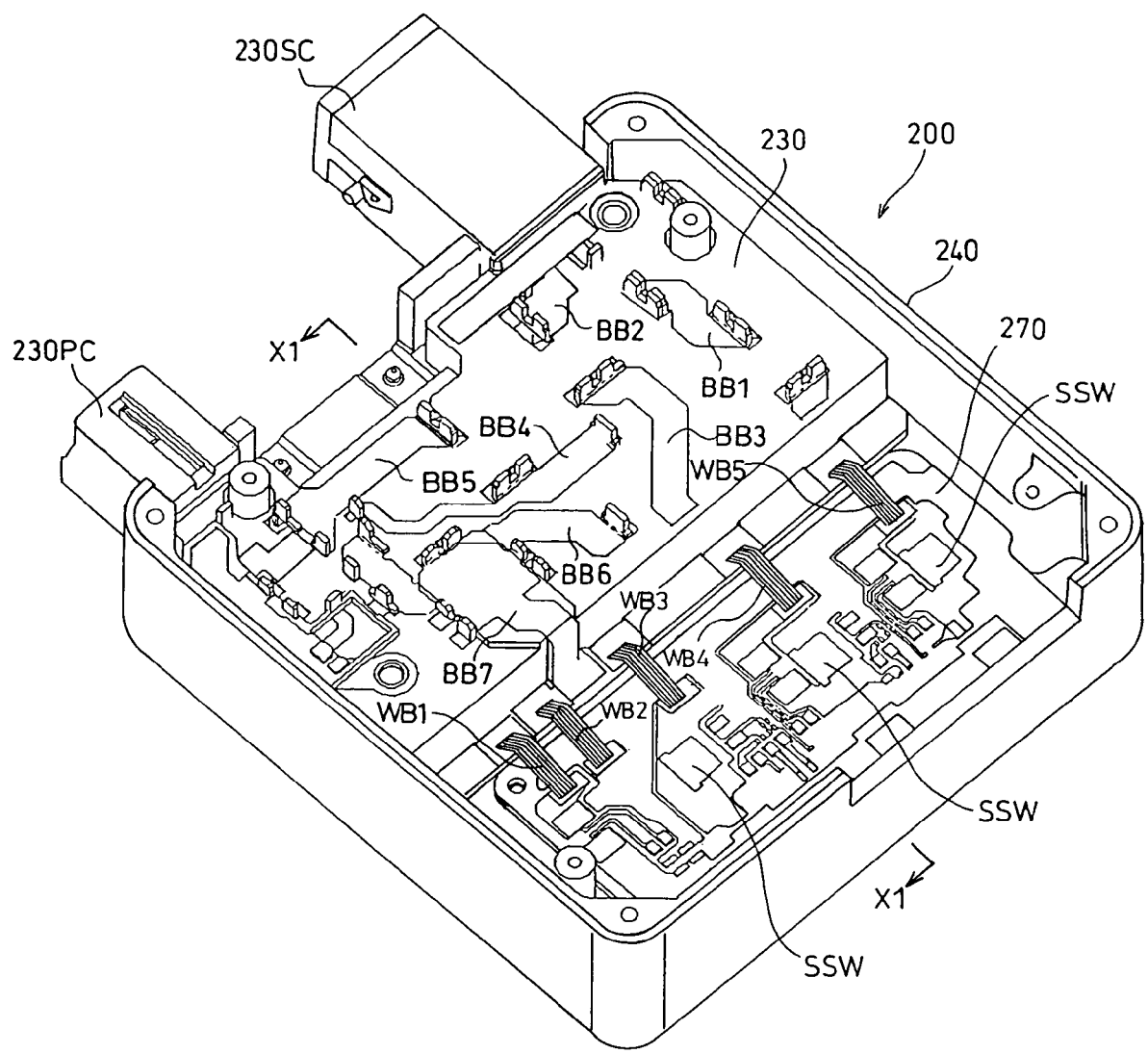
FIG. 16 is a perspective view showing the structure of the control unit for controlling the motor for electric power steering according to the embodiment of the present invention.

FIG. 16 is a perspective view showing the structure of the control unit for controlling the motor for electric power steering according to the embodiment. Note that the same reference numerals as those in FIGS. 14 and 15 denote the same components.

In the state shown in FIG. 16, the power module 210 and the conductor module 230 are mounted in the casing 240, but the control module 220 is not yet mounted.

The conductor module 230 includes a plurality of bus bars BB1, BB2, BB3, BB4, BB5, BB6 and BB7 that are integrally molded. Terminals of these bus bars are connected by welding to the corresponding terminals of electrical parts, such as the common filter CF, the normal filter NF, the ceramic capacitors CC1, CC2, and the relays RY1, RY2 and RY3 described above with reference to FIG. 13.

The plurality of semiconductor switching devices SSW are mounted in the power module 210. The power module 210 and the conductor module 230 are electrically connected to each other at five points by wire bodings WB1, WB2, WB3, WB4 and WB5. Looking at one wire bonding WB1, by way of example, the two modules are connected by arranging five aluminum wires in parallel, each wire having a diameter of, e.g., 500 μm.

The power module 210 and the conductor module 230 are arranged on the same plane in opposed relation. Stated another way, the power module 210 is arranged in the casing 240 at one side, and the conductor module 230 is arranged in the casing 240 at the other side. Accordingly, the wire bonding operation can be easily performed.

What is claimed is:

1. A motor for electric power steering, said motor having a stator, and a rotor which is rotatably supported and disposed opposite to said stator with a gap between the rotor and the stator; wherein:
   said stator comprises,
   a stator core;
   multi-phase stator coils assembled in said stator core; and
   an electrical connection apparatus electrically connected to said stator coils and supplied with electric power from the exterior;
   said electrical connection apparatus comprises,
   a first wiring member for connecting respective phases of said stator coils; and
   a second wiring member supplied with electric power from the exterior; said first wiring member and said second wiring member are stacked in an axial direction of the motor and electrically connected to each other;
   said first wiring member comprises,
   an annular base formed of an insulating member; and
   a plurality of flat plate conductors connecting said stator coils per phase and fitted into said annular base
   said plurality of flat plate conductors have the same shape, and comprise,
   a first circular-arc conductor disposed in an inner peripheral portion of said annular base;
   a second circular-arc conductor disposed in an outer peripheral portion of said annular base; and
   a connecting conductor connecting one end of said second circular-arc conductor and one end of said first circular-arc conductor to each other;
   said first circular-arc conductor and said second circular-arc conductor for different phases being disposed in said annular base in radially opposed relation.

2. The motor according to claim 1, wherein said connecting conductor is provided with a portion for connection to said second wiring member, and
   said connection portion is formed of a projecting conductor which is projected from said connecting conductor toward said second wiring member axially stacked onto said first wiring member.

3. The motor according to claim 2, wherein said connecting conductor comprises:
   a first portion radially inwardly extending from the one end of said second circular-arc conductor; and
   a second portion circumferentially bent from said first portion and extending to the one end of said first circular-arc conductor, and
   wherein said projecting conductor is projected from said second portion toward said second wiring member axially stacked onto said first wiring member.

4. The motor according to claim 1, wherein said first circular-arc conductor and said second circular-arc conductor are each provided with a plurality of U-shaped conductor connecting portions which are extended in a direction in which said first wiring member and said second wiring member are axially stacked, while penetrating through said annular base, for connection to the winding conductors of said stator coils, and
   said U-shaped conductor connecting portions of said first circular-arc conductor and of said second circular-arc conductor disposed opposite to said first circular-arc conductor are arranged in not-overlapped positions in the circumferential direction.

5. The motor according to claim 1, wherein the number of said U-shaped conductor connecting portions formed on said first circular-arc conductor and the number of said U-shaped conductor connecting portions formed on said second circular-arc conductor are the same.

6. The motor according to claim 1, wherein each of said U-shaped conductor connecting portions formed on said first circular-arc conductor and said U-shaped conductor connecting portions formed on said second circular-arc conductor has:
   a fixed end fixed to the corresponding circular-arc conductor; and
   a free end,
   said free end being projected in the same direction in which said first circular-arc conductor and of said second circular-arc conductor are opposed to each other.

* * * * *